(12) United States Patent
Chalofsky et al.

(10) Patent No.: US 11,986,947 B2
(45) Date of Patent: *May 21, 2024

(54) AUTONOMOUS TRAVERSE TIRE CHANGING BOT, AUTONOMOUS TIRE CHANGING SYSTEM, AND METHOD THEREFOR

(71) Applicant: Automated Tire, Inc., Cleveland, OH (US)

(72) Inventors: Andy Chalofsky, Cleveland, OH (US); Josh Chalofsky, Cleveland, OH (US); Stephen Toebes, Cleveland, OH (US); Kenny Pratt, Cleveland, OH (US); Seth Allen, Cleveland, OH (US)

(73) Assignee: Automated Tire, Inc., Cleveland, OH (US)

( * ) Notice: Subject to any disclaimer, the term of this patent is extended or adjusted under 35 U.S.C. 154(b) by 514 days.

This patent is subject to a terminal disclaimer.

(21) Appl. No.: 17/313,072

(22) Filed: May 6, 2021

(65) Prior Publication Data

US 2021/0347057 A1  Nov. 11, 2021

Related U.S. Application Data

(60) Provisional application No. 63/022,983, filed on May 11, 2020.

(51) Int. Cl.
*B25J 11/00* (2006.01)
*B25J 5/02* (2006.01)
(Continued)

(52) U.S. Cl.
CPC .............. *B25J 11/00* (2013.01); *B25J 5/02* (2013.01); *B25J 9/162* (2013.01); *B25J 13/08* (2013.01);
(Continued)

(58) Field of Classification Search
CPC ..... B25J 11/00; B25J 5/02; B25J 9/162; B25J 13/08; B25J 15/0019; B25J 15/0052; B60C 25/0512; B60C 25/0515
(Continued)

(56) References Cited

U.S. PATENT DOCUMENTS 5,125,298 A  6/1992  Smith ........................... 81/57.37
6,481,083 B1  11/2002  Lawson et al. ............. 29/407.04
(Continued)

FOREIGN PATENT DOCUMENTS

CA  3204143 A1  10/2019
CA  3117653 A1  11/2021  ............... B25J 9/16
(Continued)

OTHER PUBLICATIONS

Heater, Brian, "*Your next tire change could be performed by a robot*", TechCrunch, Feb. 24, 2020, the whole document. Full text available at: https://techcrunch.com/2020/02/24/your-next-tire-change-could-be-performed-by-a-robot/ (last accessed on Feb. 23, 2024).
(Continued)

*Primary Examiner* — Hadi Shakeri
(74) *Attorney, Agent, or Firm* — Bodner & Bodner, PLLC; Christian P. Bodner; Gerald T. Bodner

(57) ABSTRACT

An autonomous traverse tire changing bot includes a carriage having a carriage frame with a carriage drive section effecting autonomous traverse of the carriage, along a traverse path, relative to a traverse surface or a floor on which the bot rests, and a bot frame including at least one actuator mounted to the carriage and a bot drive section with a motor defining an actuator degree of freedom, wherein the at least one actuator has an end effector having a tire engagement tool disposed so that articulation of the at least one actuator with the actuator degree of freedom effects engagement contact of the tire engagement tool and a tire mounted on a
(Continued)

vehicle, and a controller effects traverse of the bot along the traverse path effecting dynamic positioning of the at least one actuator relative to a variable position of the vehicle with the tire mounted thereon.

28 Claims, 12 Drawing Sheets

(51) Int. Cl.
  *B25J 9/16* (2006.01)
  *B25J 13/08* (2006.01)
  *B25J 15/00* (2006.01)
  *B60C 25/05* (2006.01)

(52) U.S. Cl.
  CPC ....... *B25J 15/0019* (2013.01); *B25J 15/0052* (2013.01); *B60C 25/0512* (2013.01); *B60C 25/0515* (2013.01)

(58) Field of Classification Search
  USPC ............................................. 157/1.17–1.44
  See application file for complete search history.

(56) References Cited

U.S. PATENT DOCUMENTS

| | | | |
|---|---|---|---|
| 6,877,544 B2 | 4/2005 | Kane et al. | |
| 9,757,828 B2 | 9/2017 | Komatsu et al. | |
| 10,773,550 B1 | 9/2020 | Downey et al. | |
| 10,974,546 B2 | 4/2021 | Downey et al. | |
| 11,059,325 B2 | 7/2021 | Downey et al. | |
| 11,203,228 B2 | 12/2021 | Mica et al. | |
| 11,332,352 B2 * | 5/2022 | Bowers ................. | B66F 9/063 |
| 11,446,958 B2 | 9/2022 | Downey et al. | |
| 11,498,358 B2 | 11/2022 | Mica et al. | |
| 11,597,233 B2 | 3/2023 | Downey et al. | |
| 11,639,075 B2 | 5/2023 | Downey et al. ........... | 29/894.31 |
| 11,667,153 B2 | 6/2023 | Darolfi et al. ............ | 29/894.31 |
| 11,787,232 B2 | 10/2023 | Darolfi ...................... | 29/894.31 |
| 11,787,234 B2 | 10/2023 | Downey et al. ........... | 29/894.31 |
| 11,861,276 B2 | 1/2024 | Vargo et al. | |
| 11,872,685 B2 | 1/2024 | Chalofsky et al. | |
| 11,872,841 B2 | 1/2024 | Darolfi et al. | |
| 2003/0051326 A1 | 3/2003 | Lawson et al. ........... | 29/407.01 |
| 2007/0107183 A1 | 5/2007 | Lawson et al. ........... | 29/407.09 |
| 2011/0048649 A1 | 3/2011 | Komatsu et al. .......... | 157/1.35 |
| 2012/0125542 A1 | 5/2012 | Lawson et al. ............ | 157/1.17 |
| 2014/0174630 A1 | 6/2014 | Donnay et al. ........... | 156/64 |
| 2014/0238127 A1 | 8/2014 | Lawson et al. ............ | 73/460 |
| 2016/0290885 A1 | 10/2016 | Straitiff et al. | |
| 2017/0334073 A1 | 11/2017 | Hong et al. | |
| 2019/0232737 A1 | 8/2019 | Straitiff et al. | |
| 2020/0108659 A1 | 4/2020 | Downey et al. | |
| 2021/0094089 A1 | 4/2021 | Shah et al. | |
| 2021/0114408 A1 | 4/2021 | Darolfi | |
| 2021/0347058 A1 | 11/2021 | Chalofsky et al. | |
| 2023/0007948 A1 | 1/2023 | Chalofsky et al. | |
| 2023/0052365 A1 | 2/2023 | Vargo et al. | |
| 2023/0130910 A1 | 4/2023 | Downey et al. ........... | 29/894.31 |
| 2023/0202232 A1 | 6/2023 | Downey et al. ........... | 29/894.31 |
| 2023/0264516 A1 | 8/2023 | Downey et al. ........... | 29/894.31 |
| 2023/0417616 A1 | 12/2023 | Chalofsky et al. | |
| 2023/0417617 A1 | 12/2023 | Chalofsky et al. | |

FOREIGN PATENT DOCUMENTS

| | | | | |
|---|---|---|---|---|
| CA | 3186687 | A1 | 2/2022 | ............. B60S 9/12 |
| CA | 3157942 | A1 | 4/2022 | ............. B60B 29/00 |
| CN | 104354548 | A | 2/2015 | ............. B60C 25/00 |
| CN | 104354548 | B | 1/2017 | ............. B60C 25/00 |
| EP | 3703961 | A1 | 9/2020 | ............. B60C 25/05 |
| EP | 3909794 | A1 | 11/2021 | ............. B23P 19/06 |
| EP | 4045333 | A1 | 8/2022 | ............. B60B 29/00 |
| EP | 4188863 | A1 | 6/2023 | ............. B60S 9/12 |
| JP | 2021191668 | A | 12/2021 | ............. B60B 29/00 |
| KR | 20210137931 | A | 11/2021 | ............. B25J 19/02 |
| TW | 202146186 | A | 12/2021 | ............. B25J 13/06 |
| WO | WO2006029041 | A2 | 3/2006 | ............. B21K 1/20 |
| WO | WO2006029041 | A3 | 3/2006 | ............. B23P 21/00 |
| WO | WO2019204552 | A1 | 10/2019 | ............. B60C 25/05 |
| WO | WO2021076532 | A1 | 4/2021 | ............. B60B 29/00 |
| WO | WO2021188307 | A1 | 9/2021 | ............. B25B 23/04 |
| WO | WO2022026776 | A1 | 2/2022 | ............. B60S 9/12 |
| WO | WO2023076255 | A1 | 5/2023 | ............. B25J 13/08 |
| WO | WO2023076558 | A1 | 5/2023 | ............. G05B 19/00 |
| WO | WO2023076559 | A1 | 5/2023 | ............. G06N 20/00 |
| WO | WO2023250113 | A2 | 12/2023 | ............. B60C 25/05 |

OTHER PUBLICATIONS

Angel, Kristin, "*Calculating the Location of the Center-of-Gravity Using an Accelerometer Array*", Thesis, Rochester Institute of Technology, May 29, 2019, pp. 1-93. Abstract and full text available at: https://repository.rit.edu/theses/10117/ (last accessed on Feb. 14, 2024).

Huff, et al., "*Mothership—A serpentine tread/limb hybrid marsupial robot for USAR*", 2012 IEEE International Symposium on Safety, Security, and Rescue Robotics (SSRR), Nov. 2012, pp. 1-7. Abstract and full text available at: https://ieeexplore.ieee.org/document/6523893 (last accessed on Feb. 14, 2024).

Abad-Manterola, et al., "*Axel rover paddle wheel design, efficiency, and sinkage on deformable terrain*", 2010 IEEE International Conference on Robotics and Automation, May 2010, pp. 2821-2827. Abstract and full text available at: https://ieeexplore.ieee.org/document/5509391 (last accessed on Feb. 14, 2024).

Wang, et al., "*Dynamics modeling of a mobile manipulator for wheel slip avoidance*", 2011 IEEE International Conference on Robotics and Biomimetics, Dec. 2011, pp. 1621-1626. Abstract and full text available at: https://ieeexplore.ieee.org/document/6181521 (last accessed on Feb. 14, 2024).

McGinn, et al., "*Towards the design of a new humanoid robot for domestic applications*", 2014 IEEE International Conference on Technologies for Practical Robot Applications (TePRA), Apr. 2014, pp. 1-6. Abstract and full text available at: https://ieeexplore.ieee.org/document/6869155 (last accessed on Feb. 14, 2024).

Shin, et al., "*A partitioned control scheme for mobile robot path tracking*", IEEE 1991 International Conference on Systems Engineering, Aug. 1991, pp. 338-342. Abstract and full text available at: https://www.researchgate.net/publication/3528083_A_partitioned_control_scheme_for_mobile_robot_path_tracking (last accessed on Feb. 14, 2024).

Beckman, et al., "*Two dimensional dynamic stability for reconfigurable robots designed to traverse rough terrain*", 2008 IEEE/RSJ International Conference on Intelligent Robots and Systems, Sep. 2008, pp. 2427-2452. Abstract and full text available at: https://ieeexplore.ieee.org/document/4650753 (last accessed on Feb. 14, 2024).

Ordonez, et al., "*COBRA: COllaborative Bot with multi-Rotor Actuation*", 2019 IEEE/RSJ International Conference on Intelligent Robots and Systems (IROS), Nov. 2019, pp. 4512-4517. Abstract and full text available at: https://ieeexplore.ieee.org/document/8968480 (last accessed on Feb. 14, 2024).

Teller, et al., "*A voice-commandable robotic forklift working alongside humans in minimally-prepared outdoor environments*", 2010 IEEE International Conference on Robotics and Automation, May 2010, pp. 526-533. Abstract and full text available at: https://ieeexplore.ieee.org/document/5509238 (last accessed on Feb. 14, 2024).

The Notification of Transmittal of the International Search Report and the Written Opinion of the International Searching Authority, or the Declaration, dated Jan. 10, 2024, which was issued by the International Searching Authority of WIPO in Applicant's related international PCT application having Serial No. PCT/US2023/026028, filed on Jun. 22, 2023.

The Written Opinion of the International Searching Authority, dated Jan. 10, 2024, which was issued by the International Searching

(56) References Cited

OTHER PUBLICATIONS

Authority of WIPO in Applicant's related international PCT application having Serial No. PCT/US2023/026028, filed on Jun. 22, 2023.
The International Search Report, dated Jan. 10, 2024, which was issued by the International Searching Authority of WIPO in Applicant's related international PCT application having Serial No. PCT/US2023/026028, filed on Jun. 22, 2023.
A Communication Pursuant to Rule 62 EPC, dated Oct. 11, 2021, issued by the European Patent Office in Applicant's related European Patent Application No. EP21173130.2, filed on May 10, 2021.
An Extended European Search Report (Oct. 11, 2021—mailed with the Communication Pursuant to Rule 62 EPC), issued by the European Patent Office in Applicant's related European Patent Application No. EP21173130.2, filed on May 10, 2021.
A European Search Opinion (Oct. 11, 2021—mailed with the Communication Pursuant to Rule 62 EPC), issued by the European Patent Office in Applicant's related European Patent Application No. EP21173130.2, filed on May 10, 2021.
A Communication Pursuant to Article 94(3) EPC, dated Sep. 20, 2023, issued by the European Patent Office in Applicant's related European Patent Application No. EP21173130.2, filed on May 10, 2021.

\* cited by examiner

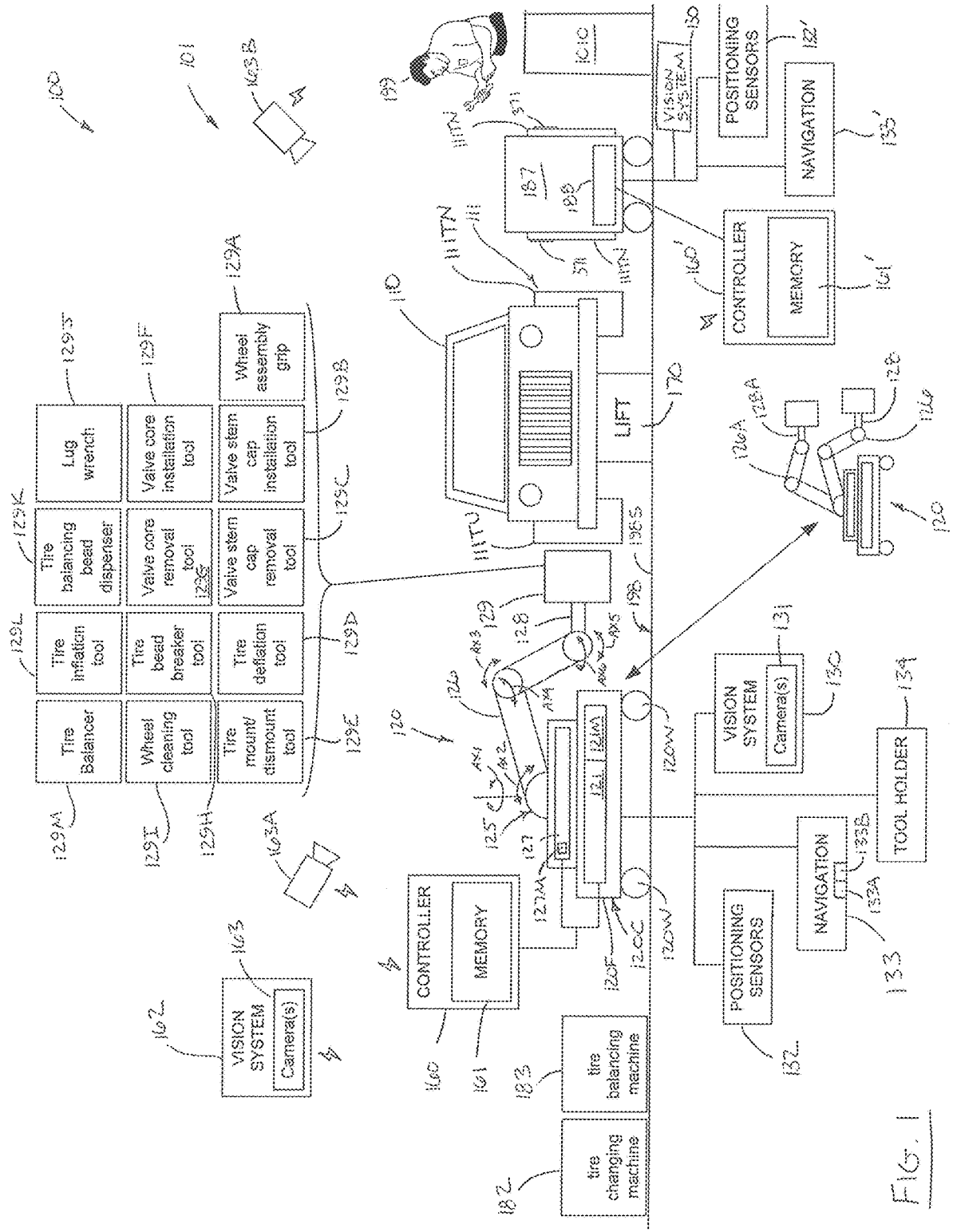

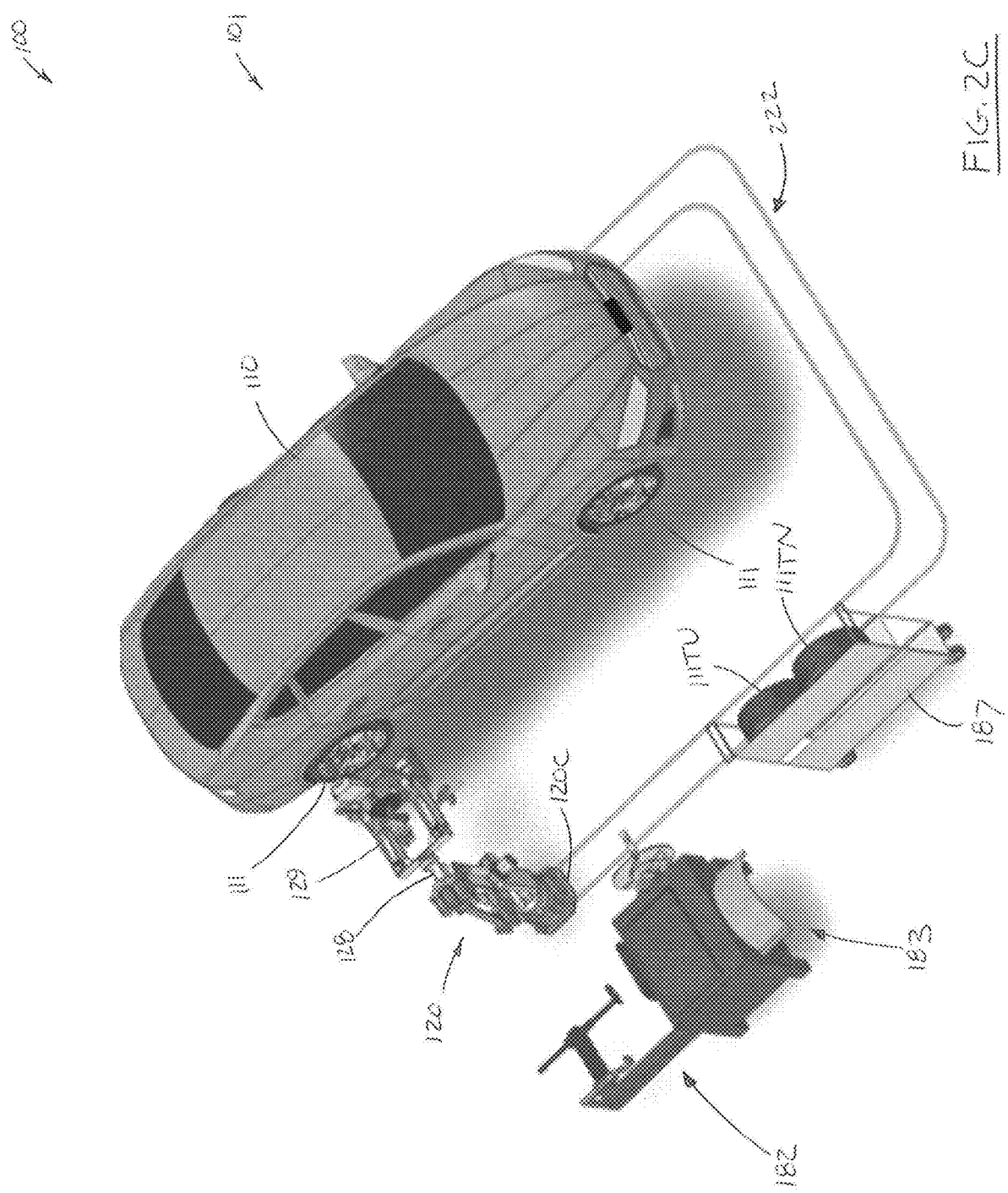

SLAM NAVIGATION

BEACON NAVIGATION

MARKERS AND BEACON NAVIGATION

AD HOC ROUTE MARKERS

AUTONOMOUS TRAVERSE TIRE CHANGING BOT, AUTONOMOUS TIRE CHANGING SYSTEM, AND METHOD THEREFOR

This Non-Provisional Patent application claims priority to and the benefit of U.S. Provisional Patent Application No. 63/022,983, filed May 11, 2020, the disclosure of which is incorporated herein it its entirety.

BACKGROUND

1. Field

The present disclosure generally relates to vehicle tire changing equipment, and more particularly, to automated vehicle tire changing equipment and systems.

2. Brief Description of Related Developments

Like many industries that generally rely on human labor, there is a shortage of vehicle service technicians to meet demand with respect to, for example, the automobile service industry. Even with an adequate number of employees, throughput and efficiency of an automobile service facility or center may be impacted if one of their vehicle service technicians does not show up for work.

In addition to maintaining an adequate number of vehicle service technicians, automobile service facilities also face a challenge of finding a suitably qualified technician for any given tasks. For example, senior vehicle service technicians are often too highly paid for a service facility to justify the senior vehicle service technician to perform certain types of work. Moreover, it is not uncommon for some senior vehicle service technicians to refuse work that is below their level of expertise. For example, a senior vehicle service technician may refuse to perform vehicle tire changes. This creates a problem for service facilities in that an appropriate mix of vehicle service technician skill level must generally be maintained to maximize profits and efficiently operate the service facility.

A constantly changing level of consumer demand for certain automotive services may also compound the problem of efficient service facility operation because at some points in time the service facility may have an appropriate number of vehicle service technicians with an appropriate skill level for a certain task(s), such as vehicle tire changes, while at other times that same number of vehicle service technicians may be unsuitable for fulfilling customer demand with respect to the vehicle tire changes.

Generally, depending on the size of the service facility, tire changes are performed fully manually, manually with machine assist, or in a semi-automated manner. Fully manual tire changes are labor intensive and involve the use of manual bead breakers, crowbars or mount and demount tools, tire irons, and wheel supports. The amount of labor involved with fully manual tire changes may limit a number of tire changes that can be performed by a vehicle service technician in a given amount of time. The manual with machine assist tire changes reduce the labor involved with the tire change and generally include a machine with hydraulic-powered axes of motion that assist with breaking of the tire bead as well as maneuvering of the tire bead around a flange of the wheel from or to which the tire is being removed or installed. Semi-automated tire machines reduce the labor involved with a tire change even further, thus allowing a service technician to perform more tire changes; however, these semi-automated machines generally require constant vehicle service technician presence making multiple simultaneous tire changes by a single vehicle service technician unfeasible. The number of tire changes (and vehicles processed) that can be performed with the above-noted conventional tire change apparatus/methods is generally limited by the number of machines and corresponding vehicle service technicians available to use those machines.

In addition to the tire changing process, newly installed tires require the tire/wheel assembly to be balanced. This is also typically performed by a vehicle service technician using a conventional tire balancing machine with the tire/wheel assembly off of the vehicle. While tire balancing machines that balance the tire/wheel assembly with the tire/wheel assembly on the vehicle have been used in the past, all-wheel-drive and traction control systems on newer vehicles have all but eliminated these conventional methods of balancing the tire/wheel assembly with the tire/wheel assembly on the vehicle. Tire balancing beads may also be used to dynamically balance a tire/wheel assembly, where the tire balancing beads are inserted into the tire by a vehicle service technician before seating the tire bead on the wheel. In any event, each of these tire balancing methods requires the constant presence of the vehicle service technician, again limiting the number of tires that can be changed in a given time period.

BRIEF DESCRIPTION OF THE DRAWINGS

The foregoing aspects and other features of the present disclosure are explained in the following description, taken in connection with the accompanying drawings, wherein:

FIG. 1 is a schematic illustration of an automated tire changing system incorporating aspects of the present disclosure;

FIG. 2C is yet another schematic illustration of the automated tire changing system of FIG. 1 incorporating aspects of the present disclosure;

DETAILED DESCRIPTION

FIG. 1 illustrates an exemplary automated tire changing system 100 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

Figure 3:
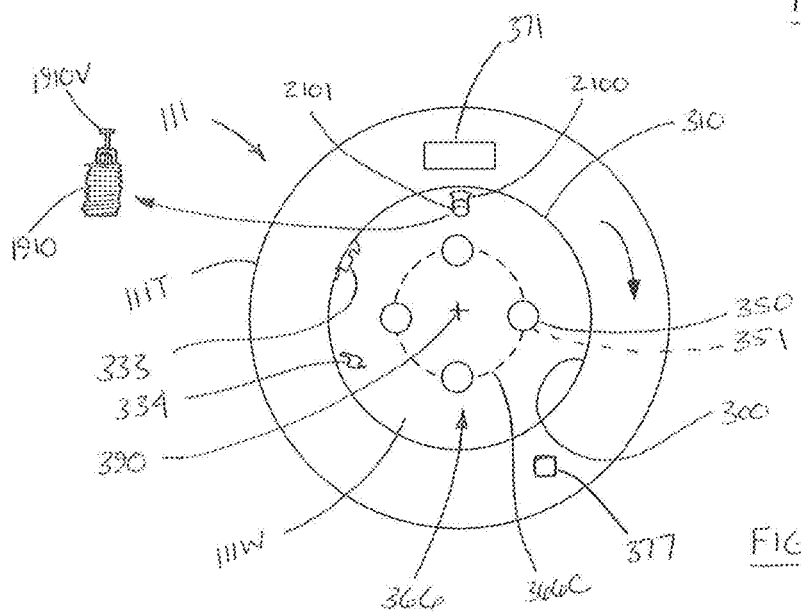
FIG. 3 is an exemplary illustration of a tire and wheel assembly in accordance with aspects of the present disclosure.

Referring to FIGS. 1 and 3, the aspects of the tire changing system 100 described herein automate the process of changing tires 111T on a vehicle 110. As will be described herein the tire changing system 100 provides for changing tires with the wheel 111W on (i.e., in situ) the vehicle 110 or by removing the wheel 111W from the vehicle 110. In one or more aspects, the tire changing system 100 provides for an operator of the tire changing system 100, such as a vehicle service technician 199, to select an in-situ tire change or a tire change by removing the wheel 111W from the vehicle 110. The vehicle 110 is any suitable vehicle having a wheel assembly 111 (including a tire 111T mounted on a wheel or rim 111W) coupled to and removable from a wheel hub. Suitable examples of a vehicle 110 include, but are not limited to, passenger vehicles, commercial vehicles, and recreational vehicles.

The aspects of the tire changing system 100 described herein automate tasks associated with changing tires 111T on the vehicle 110. A tire change, as described herein, includes at a minimum, removal of an old or used tire 111TU from the wheel 111W and replacement of the used tire 111TU with what may be referred to as a replacement or other (new) tire 111TN that is installed on the wheel 111W in place of the removed used tire 111N. The aspects of the tire changing system 100 provides for a single vehicle service technician 199 to simultaneously monitor the changing of more than one tire on the same or different vehicles addressing the problems noted above. The aspects of the tire changing system 100 described herein generally limit vehicle service technician 199 interaction with the vehicle(s) 110 and/or tire changing apparatus (e.g., tire changing machines, tire balancers, etc.) and substantially eliminates lifting of wheel assemblies 111 by the vehicle service technician 199. This allows the vehicle service technician 199 to work in a less labor intensive environment and interact with the tire changing system 100 when necessary (e.g., such as to deliver vehicles 110 to/from the tire changing system 100, provide replacement tires 110TN or other supplies (valve stems, valve caps, lubricants, cleaning solutions, etc.) to the tire changing system 100, perform maintenance on components of the tire changing system, etc.). The aspects of the tire changing system 100 also eliminate the need to lift the vehicle 110 to heights that would be ergonomic for the vehicle service technician 199 to remove and install the wheel assembly 111 from and to the vehicle 110. Here the vehicle 110 only need be lifted (or a normal force be removed from the wheel assembly 111) to a height that the tire 111T no longer contacts a traverse surface on which the vehicle 110 was moving so that suitable clearance is provided around the tire 111T to facilitate removal of the wheel assembly 111 from the vehicle or removal of the tire 111T from the wheel 111W.

Still referring to FIG. 1, the tire changing system 100 is configured to change one or more tires with the wheel 111W remaining on (i.e., in-situ) the vehicle 110 and/or with the wheel 111W removed from the vehicle 110. The tire changing system 100 includes at least one tire changing station 101, noting that multiple tire changing stations may be provided so that multiple vehicles 110 can be processed simultaneously by a single vehicle service technician 199. The autonomous configuration of the tire changing system 100 provides for the processing of multiple vehicles 110 by a single vehicle service technician 199 and with minimal intervention by the vehicle service technician 199 in the tire changing process. Generally the tire changing station 101 includes at least one autonomous traverse tire changing bot 120 (referred to herein for convenience as "bot 120"). It should be understood that reference to an autonomous traverse tire changing bot 120 does not preclude inclusion of more than autonomous traverse tire changing bot as will be described in greater detail herein. For example, some aspects of the present disclosure (as described herein) include more than one separate and/or independent and cooperative bots 120, cooperating to effect a tire change (through in some aspects a single robot directly effects the tire change). In some aspects, there multiple bots 120 are configured for respective tasks. For example, one bot 120 is configured for wheel assembly 111 or tire 111T removal, another bot 120 is configured for lug nut/bolt removal, or any other process of the tire change as indicated by, for example, the tools 129A-129M described herein.

Figure 10:
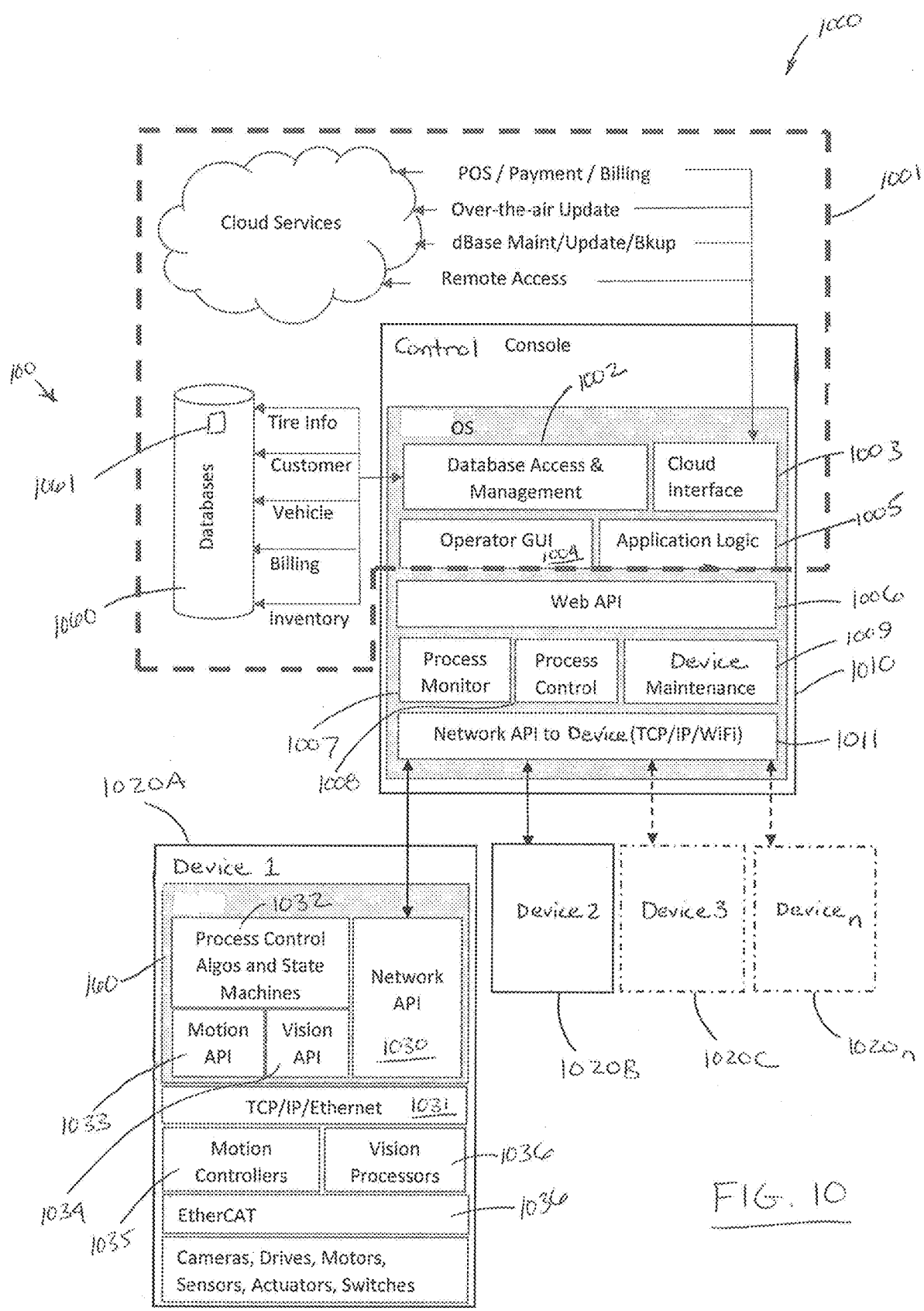
FIG. 10 is a schematic block diagram of the automated tire changing system in accordance with aspects of the present disclosure.

Referring to FIGS. 1 and 10 a control architecture 1000 of the tire changing system 100 will be described. The control architecture of the tire changing system 100 generally includes a business and application logic portion 1001, a control console 1010, and one or more tire changing system devices 1020A-1020n (where n is an integer that denotes an upper numerical limit to the number of tire changing system devices in the tire changing system 100). The one or more tire changing system devices 1020A-1020n are any one or more of the devices described herein (i.e., bots 120, automated or semi-automated tire changing machines 182, automated or semi-automated tire balancing machines 183, tire storage racks/carts 187, barriers, etc.). The one or more tire changing system devices 1020A-1020n are in one aspect assigned to a single tire changing station 101 (such as where the service facility has a single service bay), or in other aspects, some of the tire changing system devices 1020A-1020n are assigned to one tire changing station 101 and other ones of the tire changing system devices 1020A-1020n are assigned to another tire changing station 101 (such as where the service facility has more than one service bay).

As can be seen in FIG. 10, a portion of the business and application logic portion 1001 overlaps with a portion of the control console 1010; however in other aspects there may not be any overlap. For exemplary purposes, a portion of the business and application logic portion 1001 is resident in the control console 1010. The business and application logic portion 1001 is configured with any suitable operating system (OS) configured (e.g., programmed with non-transitory computer readable code executed on any suitable processor of the control console 1010) to facilitate one or more of local services and cloud based services. The control console 1010 includes a database access and management module 1002 (which may be configured as a hardware or software module), a cloud interface module 1003 (which may be configured as a hardware or software module), an operator graphical user interface 1004, and an application logic module 1005 (which may be configured as a hardware or software module) that are shared with the business and application logic portion 1001.

The operator graphical user interface 1004 is configured (e.g., programmed with non-transitory computer readable code executed any suitable processors and memory) to facilitate operator input and control (e.g., both operational control for tire changing services and administrative services (e.g., billing, software updates, database entry, billing, inventory, etc.) control) of the tire changing system 100. The database access and management module 1002 is in communication with operator graphical user interface 1004 and any suitable database(s) 1060 and facilitates access to and storage of information including, but not limited to tire information, customer information, vehicle information, billing information, and inventory and relationships between the various information (i.e., each customer or vehicle has a respective record that includes respective tire information, respective billing information, etc.). The cloud interface module 1003 is configured (e.g., programmed with non-transitory computer readable code executed any suitable processors and memory) to provide an interface between the control console and one or more cloud services. It is noted that reference to cloud services herein pertains to cloud computing which is known as the on-demand availability of computer system resources, especially data storage and computing power, without direct active management by the user and generally refers to data centers available to many users over the Internet. These cloud services include but are not limited to remote access to the tire changing system 100, point of service payment and billing, and over-the-air software updates to components of the tire changing system 100. The application logic module 1005 is configured to at least interface the operator graphical user interface 1004, the database access and management module 1002, and the cloud interface module 1003 with each other.

The control console 1010 also includes a Web application interface 1006, a process monitor module 1007 (which may be configured as a hardware or software module), a process control module 1008 (which may be configured as a hardware or software module), a device maintenance module 1009 (which may be configured as a hardware or software module), and a network application interface to device module 1011 (which may be configured as a hardware or software module). The Web application interface 1006 is configured (e.g., programmed with non-transitory computer readable code executed any suitable processors and memory) to provide access, e.g., for the operator graphical user interface and/or other modules of the control console, to a web server and/or web browser (e.g., for accessing the cloud services). The process monitor module 1007 is configured to (e.g., programmed with non-transitory computer readable code executed any suitable processors and memory) monitor (e.g., by sending data to and receiving data from the devices 1020A-1020n indicating a tire change process has started, has ended, or paused due to error) the tire changing process as described herein and provide feedback to the process control module 1008. The process control module 1008 is programmed (e.g., programmed with non-transitory computer readable code executed any suitable processors and memory) to issue commands to the devices 1020A-1020n controlling the process flow for a tire change so that tire change operations are performed in a predetermined sequence that may depend on the type of tire change and tire change services requested. The device maintenance module 1009 is programmed (e.g., programmed with non-transitory computer readable code executed any suitable processors and memory) to monitor a health of the devices 1020A-1020n and provide maintenance alerts to the operator through the operator graphical user interface 1004. The network application interface to device module 1011 is configured to provides a wired or wireless interface between the components of the control console and the devices 1020A-1020n.

Referring still to FIG. 1, the bot 120 including a bot frame 125 also includes or is coupled/mounted to a carriage 120C. The carriage 120C is any suitable carriage that facilitates bot 120 traverse as described herein. For example, in one or more aspects, the carriage 120C is a wheeled carriage that includes a carriage frame 120F, wheels 120W supporting the carriage frame 120F, and a carriage drive section 121; while on one or more other aspects the carriage 120C is a sliding platform that slides or rides along rails and is driven in any suitable manner, such as by ball screws or other linear actuator. For exemplary purposes only the carriage 120C will be described herein as a wheeled carriage but it should be understood that the carriage may or may not include wheels and be driven in any suitable manner (e.g., slid along rails, etc.) so that the bot 120 moves relative to the vehicle 110 for effecting a tire change as described herein.

For exemplary purposes only, the carriage drive section 121 (whether wheeled or otherwise) includes at least one motor 121M that defines at least one degree of freedom powering at least one of the wheels 120W (or rotating a ball-screw, etc.) effecting autonomous traverse of the carriage 120C, along a traverse path 299 (see, e.g., FIG. 2A), relative to a traverse surface or a floor 198 on which the bot 120 rests. As will be described herein, the traverse path 299 along which the bot travels is in one or more aspects, a path around the entire vehicle 110 or a path around a portion of the vehicle 110, where the traverse path may depend on a number of bots 120 are included in the tire changing system 100. For example, where there are two bots 120 each bot traverses along a respective side (e.g., driver or passenger side) of the vehicle 110. As another example, where there are two bots 120 on a common side of the vehicle 110 (e.g., either the driver or passenger side) each bot 120 traverses along a respective portion of the common side of the vehicle 110.

As will be described in greater detail, the traverse path (such as traverse path 299 in FIG. 2A) may be defined in any suitable manner, such as through non-contact bot guidance on an undeterministic travel surface (i.e., without physical constraints guiding movement of the bot 120) or with physical constraints (such as rails) on which the bot 120 rides. Where the bot 120 travels on an undeterministic travel surface the wheels 120W are configured in any suitable manner so as to provide the carriage 120C with both linear traverse and rotational movement. For example, one or more of the wheels 120W may be steerable or the wheels may be holonomic wheels (such as Mecanum wheels, Omni wheels, or poly wheels). Where the bot 120 travels on, e.g., rails 236 (see FIG. 2D), the wheels 120W may be any suitable wheels configured to follow and travel along the rails.

In one or more aspects, the entire bot 120 may align itself in one or more degrees of freedom with respect to the vehicle 110, the wheel assembly 111, the wheel 111W, the tire 111T or any other component of the tire changing system 100 to perform a tire changing operation. For exemplary purposes only, a center of rotation of the tire bead breaker tool 129H (described herein) is substantially aligned with a center of rotation of the wheel assembly 111 and the plane in which the tire bead breaker tool 129H acts is set so as to be substantially parallel to the rotational axis of the wheel assembly 111. Where the carriage 120C includes steerable or holonomic wheels, this positional adjustment of the tire bead breaker tool 129H is accomplished, at least in part, by controlling the wheels for positioning the bot 120 along one or more of the following directions:

linear direction 237 extending substantially parallel to both the floor 198 and the vehicle 110 and extending lengthwise (from front to back) relative to the vehicle 110; and linear direction 238 extending substantially perpendicular to the vehicle 110 and substantially parallel to the floor 198;

Where the carriage 120C is guided by, for example, rails 236 (i.e., constrained traverse) movement of the carriage in direction 237 is accomplished by moving the carriage along the rails 236. However, movement in direction 238 is limited due to the constraints of the rails 236. Here the carriage 120C includes a movement stage 120S that coupled to the frame 120F so as to move in at least direction 238 relative to the frame 120F. For example, the movement stage 120S is coupled to the frame 120F by stage guide rails having any suitable drive that provides the movement stage 120S with linear movement in direction 238.

In one or more aspects, such as where the carriage 120S is rail guided, intervening between the movement stage 120S and the stage guide rails is one or more rotational couplings. In other aspects, such as where the carriage 120 is a wheeled carriage, the one or more rotational couplings couple a movement stage 120S (similar to that of the rail guided carriage) to the frame 120F. These one or more rotational couplings are include any suitable drives for moving the movement stage 120S in one or more of the following directions:

rotational direction 239 having an axis of rotation 239R extending substantially perpendicular to the floor;
rotational direction 240 having an axis of rotation 240R extending substantially parallel with the floor 198; and
rotational direction 241 having an axis of rotation 240R extending substantially parallel with the floor 198.

In some aspects, a vertical drive may be provided to move the movement stage 120S (and/or the frame 120F) vertically to raise or lower the movement stage 120S (and/or the frame 120F). As such, the movement stage 120S may be provided with five or six degrees of freedom (in other aspects there may be more than six or less than five degrees of freedom) for aligning the bot 120 with respect to the vehicle 110, the wheel assembly 111, the wheel 111W, the tire 111T or any other component of the tire changing system 100 to perform a tire changing operation.

The bot frame 125 includes at least one robotic articulated arm 126 (referred to herein for convenience as an actuator or "robotic arm 126") and a bot drive section 127. In one or more aspects, the at least one robotic arm 126 may be any suitable multi-axis arm available from such manufacturers as Fanuc Robotics Company, Kuka Automation Company, and Yaskawa Electric Corporation. In one or more aspects the at least one robotic arm 126 has a bespoke arm configuration with any suitable number of axes. The at least one robotic arm 126 (whether commercially available or bespoke) has any suitable number of degrees of freedom for effecting a tire change as described herein. For example, the at least one robotic arm 126 is a one axis arm, a two axis arm, a three axis arm, a five axis arm, a six axis arm, a seven axis arm, nine axis arm, or an arm with any other suitable number of axes. In one or more aspects, as described herein, the bot 120 has more than one robotic arm 126, 126A where, in one or more aspects, the different arms have different numbers of axes and/or different tire changing capabilities. The robotic arm 126 is driven by the bot drive section 127, where the bot drive section 127 includes at least one motor 127M that defines a bot arm degree of freedom, separate and distinct from the at least one degree of freedom powering the traverse path 299 axis of the bot 120 (e.g., the degree of freedom powering the at least one of the wheels 120W, ball screw rotation, etc.). The robotic arm has an end effector 128 that includes a wheel or tire engagement tool 129 disposed so that articulation of the at least one robotic arm 126 with the bot arm degree of freedom effects engagement contact of the wheel or tire engagement tool 129 and a wheel 111W or a tire 111T mounted on the vehicle 110. The arm articulation axis/axes AX1-AX6 defined by articulation of the at least one robotic arm 126 with the bot arm degree of freedom is separate and distinct from the traverse path 299 along which the carriage 120C traverses. As described herein, the aspects of the present disclosure provide for automated control of fully dynamic pose of the carriage 120C (at least along one drive axis (e.g., along rails or in at least one traverse direction along the undeterministic traverse surface) of the carriage 120C) so that articulation of the at least one robotic arm 126 (along a different drive axis than the drive axis of the carriage 120C) engages any suitable tool (such as those described herein) coupled to the end effector 128 of the at least one robotic arm 126 to a variably positioned wheel 111W and/or tire 111T on the vehicle 110.

Referring to FIGS. 1 and 3, in accordance with one or more aspects of the present disclosure the wheel or tire engagement tool 129 includes one or more of a wheel assembly grip 129A, a valve stem cap installation tool 129B, a valve stem cap removal tool 129C, a tire deflation tool 129D, a tire mounting/dismounting tool 129E, a valve core installation tool 129F, a valve core removal tool 129G, a tire bead breaker tool 129H, a wheel cleaning tool 129I, a lug wrench 129J, a tire balancing bead dispenser 129K, a tire inflation tool 129L, a tire balancer 129M, and/or any other suitable tool that effects changing a tire 111T. In one or more aspects, the above-noted tools are stored on any suitable tool holder 134 carried by the carriage 120C or located off-board the bot 120 at a location within the tire changing station 101 that is accessible by the at least one robotic arm 126. In one or more aspects, the above-noted tools are interchangeable/swappable with each other so that the end effector 128 places one and picks up another different tool for performing tire changing tasks. For example, the bot 120 includes a controller 160 that is configured to command the at least one robotic arm 126, based on a task to be performed, to automatically exchange one tool for another, such as through articulation of the at least one robotic arm 126 the end effector 128 places a tool (e.g., such as the tire bead breaker tool 129H) at the tool holder 134 and then picks another different tool from the tool holder (e.g., such as tire inflation tool 129L) for performing a subsequent step in the tire change process. The controller 160 is also configured to control the drives of the bot 120 (e.g., drives of the arm 126 and carriage 120C that effect movement of the arm 126 and carriage 120C as described herein) to position the carriage 120C relative to the vehicle 110, another bot 120 or other component (e.g., tire balancer, tire changing machine, cart, etc.) of the tire changing system 100. Referring also to FIG. 10, the controller 160 includes a network application interface 1030 and a communication module 1031 (configured as a hardware or software module) so that the bot 120 communicates with the control console 1010 and/or cloud based services (e.g. such as for bot software updates). The controller 160 is programmed with process control algorithms and state machines 1032 to effect the operation of the bot 120 as described herein. A motion application interface 1033 and vision application interface 1034 are also provided in the controller 160 so that the process control algorithms and state machines 1032 interface with motion controllers 1035 and vision processors 1036 of the bot 120. The bot 120 includes any suitable onboard communications network 1037 (such as an EtherCAT or other suitable network) that communicably couples the cameras, drives, moors, sensors, actuators, switches, etc. (as described herein) of the bot 120 to a respective motion controller 1035 or vision processor 1036. While the controller 160 of the bot 120 was described, it should be understood that controllers of the other tire changing system 100 devices 1020A-1020n are substantially similar to the controller 160.

In other, aspects the bot 120 includes more than one robotic arm 126, 126A (two arms are shown in FIG. 1 for exemplary purposes but in other aspects there may be more than two arms). Each of the more than one robotic arm 126, 126A has a different respective arm articulation axis (noting each robotic arm 126, 126A includes respective axes AX1-AX6 of articulation), and a different respective end effector 128, 128A disposed for working on the wheel 111W or tire 111T mounted on the vehicle 110 (or off of the vehicle). Here, in one or more aspects, each robotic arm 126, 126A holds a different one of the tools noted above (noting that in some aspects, the tools are also exchangeable as noted above). Further, the above-noted tools are combined, in some aspects, so that a single combination tool performs several tasks. For example, in one aspect, the wheel assembly grip 129A is combined with one or more of the a valve stem cap installation tool 129B, a valve stem cap removal tool 129C, a tire deflation tool 129D, a tire mounting/dismounting tool 129E, a valve core installation tool 129F, a valve core removal tool 129G, a tire bead breaker tool 129H, a wheel cleaning tool 129I, a lug wrench 129J, a tire balancing bead dispenser 129K, a tire inflation tool 129L, a tire balancer 129M, and/or any other suitable tool that effects changing a tire 111T (noting any other combinations of the various tools may be effected and are within the scope of the present disclosure).

The wheel assembly grip 129A has any suitable configuration for gripping the wheels assembly 111 for carrying the wheel assembly to and from the vehicle 110, such as through articulation of the at least one robotic arm 126 and guided by position information provided by any suitable sensors, such as those described herein. For exemplary purposes only the wheel assembly grip 129A has any suitable configuration and/or components to effect carrying the wheel assembly 111, where suitable examples of wheel assembly grips can be found in U.S. Pat. No. 5,125,298 issued on Jun. 30, 1992; U.S. Pat. No. 9,757,828 issued on Sep. 12, 2017; and United States pre-grant publication number 2017/0334073, published on Nov. 23, 2017, the disclosures of which are incorporated herein by reference in their entireties. The wheel assembly grip 129A includes an end effector mount that couples the wheel assembly grip 129A to the end effector 128 of the at least one robotic arm 126.

The valve stem cap installation tool 129B has any suitable configuration for installing a valve stem cap 2101 to a valve stem 2100 of the wheel 111W. For exemplary purposes only, the valve stem cap installation tool 129B includes any suitable valve stem cap holder configured to thread the valve stem cap 2101 onto the valve stem 2100. In one aspect, the valve stem cap holder, through articulation of the at least one robotic arm 126 and guided by position information provided by any suitable sensors (located on-board or off-board the bot 120), such as those described herein, picks up a valve stem cap 2101, e.g., from any suitable rack accessible to or carried by the bot 120 (or from any other suitable location such as fed through the valve stem cap holder). Through articulation of the at least one robotic arm 126, and guided by position information provided by any suitable sensors such as those described herein, the valve stem cap 2101 is aligned with the valve stem 2100 and installed on the valve stem 2100. The valve stem cap installation tool 129B includes an end effector mount that couples the valve stem cap installation tool 129B to the end effector 128 of the at least one robotic arm 126.

The valve stem cap removal tool 129C is substantially similar to the valve stem cap installation tool 129B (or have any other suitable configuration for removing valve stem caps 2101 from the valve stems 2100; however, rather than pick up or feed valve stem caps 2101 to the valve stem cap holder, the valve stem caps are ejected from the valve stem cap holder after removal and placed in any suitable storage hopper. Otherwise, the valve stem cap removal tool 129C operates in a manner that is substantially the reverse of the valve stem cap installation tool 129B. The valve stem cap removal tool 129C includes an end effector mount that couples the valve stem cap removal tool 129C to the end effector 128 of the at least one robotic arm 126. The valve stem cap 2101 may be removed or installed with the wheel 111W mounted in situ on the vehicle 110 or with the wheel 111W removed from (i.e., located off of) the vehicle 110.

The tire deflation tool 129D has any suitable configuration for deflating the tire 111T either through the valve stem 2100 or by puncturing a sidewall of the tire 111T. For non-limiting exemplary purposes only, the tire deflation tool 129D includes an end effector mount that couples the tire deflation tool 129D to the end effector 128 of the at least one robotic arm 126. The tire deflation tool includes a suitable needle or pin that extends from the end effector mount and is configured to extend, e.g., through articulation of the at least one robotic arm, and guided by position information provided by any suitable sensors such as those described herein, into the valve stem 2100 to depress a valve 1910V of a valve core 1910 of the wheel 111W to deflate the tire 111T mounted to the wheel 111W. In other aspects, the tire deflation tool 129D has any suitable configuration and/or components for deflating a tire. In one aspect, the tire deflation tool 129D on articulation of the at least one robotic arm 126 deflates the tire 111T mounted to the wheel 111W with the wheel 111W mounted in situ on the vehicle 110; while in other aspects, the tire deflation tool 129D on articulation of the at least one robotic arm 126 deflates the tire 111T mounted to the wheel 111W with the wheel 111W removed from (i.e., located off of) the vehicle 110.

The valve core removal tool 129G also effects deflation of the tire 111T and/or replacement of a damaged/defective valve core 1910. The valve core removal tool 129G has any suitable configuration for engaging the valve core 1910 and removing the valve core 1910 from the valve stem 2100. For non-limiting exemplary purposes only, the valve core removal tool 129G includes an end effector mount that couples the valve core removal tool 129G to the end effector 128 of the at least one robotic arm 126. The valve core removal tool 129G includes any suitable valve core engagement that is coupled to the end effector mount to effect unthreading the valve core 1910 from the valve stem 2100 through articulation of the at least one robotic arm 126, and guided by position information provided by any suitable sensors such as those described herein. For example, any suitable sensors, such as those described herein identify the position and orientation of the valve core 1910 and based on the identified position and orientation, the valve core engagement is positioned relative to the valve core 1910 through articulation of the at least one robotic arm 126 to engage the valve core 1910 to effect removal of the valve core 1910 from the valve stem 2100 with the valve core removal tool 129G. Here, the removed valve core 1910 may be ejected in any suitable manner (e.g., compressed air, etc.) from the valve core removal tool 129G into any suitable holding bin. In other aspects, the valve core removal tool 129G has any suitable configuration and/or components for removing valve cores from valve stems.

The valve core installation tool 129F is substantially similar to the valve core removal tool 129G; however, here the valve core engagement unthreads the valve core 1910 from the valve stem 2100. Here, any suitable sensors, such as those described herein, are employed to identify a positions and orientations of the valve stem 2100 and a valve core 1900, where the valve core 1900 is held in any suitable rack 1700 accessible to or carried by the bot 120. Based on the identified position and orientation of the valve core 1910, the valve core installation tool 129F, through articulation of the at least one robot arm 126, grips the valve core 1910 and positions the valve core 1910 relative to the valve stem 2100 and installs the valve core 1910 into the valve stem 2100 based on the identified position and orientation of the valve stem 2100. In other aspects, the valve core installation tool 129F has any suitable configuration and/or components for installing valve cores to valve stems. The valve core 1910 may be installed or removed with the wheel 111W mounted in situ on the vehicle 110 or with the wheel 111W removed from (i.e., located off of) the vehicle 110.

The tire mounting/dismounting tool 129E, has any suitable configuration for mounting/dismounting (e.g., moving a bead 300 of the tire 111T over a flange 310 of the wheel 111W) to install or remove the tire 11T to or from the wheel 111W. For non-limiting exemplary purposes only the tire mounting/dismounting tool 129E includes an end effector mount that couples the tire mounting/dismounting tool 129E to the end effector 128 of the at least one robotic arm 126. The tire mounting/dismounting tool 129E includes a tool head substantially similar to those described in U.S. Pat. No. 5,125,298 (previously incorporated by reference herein) or found on conventional semi-automated tire mounting machines. The tire mounting/dismounting tool 129E may be positioned relative to the tire 111T and wheel 111W for mounting or dismounting a tire 111T to or from the wheel 111W through articulation of the at least one robotic arm 126 which is guided by sensor information from any suitable sensors such as those described herein. In other aspects the tire mounting/dismounting tool 129E has any suitable configuration and/or components for mounting/dismounting tires. In one aspect, the tire mounting/dismounting tool 129E, on articulation of the at least one robotic arm 126 engages the tire 111T of the wheel 111W mounted on the vehicle 110 and effects mounting of the tire 111T on the wheel 111W and dismounting of the tire 111T off the wheel 111W with the wheel 111W mounted in situ on the vehicle 110; while in other aspects, the tire mounting/dismounting tool 129E, on articulation of the at least one robotic arm 126 engages the tire 111T of the wheel 111W mounted on the vehicle 110 and effects mounting of the tire 111T on the wheel 111W and dismounting of the tire 111T off the wheel 111W with the wheel 111W removed from (i.e., located off of) the vehicle 110.

The tire bead breaker tool 129H has any suitable configuration for breaking the bead of the tire 111T from the flange of the wheel 111W. For non-limiting exemplary purposes only the tire mounting/dismounting tool 129E includes an end effector mount that couples the tire mounting/dismounting tool 129E to the end effector 128 of the at least one robotic arm 126. The tire bead breaker tool 129H includes any suitable wedges, sliders, or other tire engagements configured to slide or move the tire bead 300 towards a centerline of the wheel 111W (i.e., in a direction along an axis of rotation 390 of the wheel 111W) to separate the tire bead 300 from the flange 310 of the wheel 111W. The tire bead breaker tool 129H is positioned relative to the tire 111T and wheel 111W through articulation of the at least one robotic arm 126, which is guided by sensor information from any suitable sensors such as those described herein, to effect breaking the tire bead 300. In other aspects the tire bead breaker tool 129H has any suitable configuration and/or components for breaking the bead of the tire 111T a the term "break the tire bead" is known by those skilled in the art. In one aspect, the tire bead breaker tool 129H on articulation of the at least one robotic arm 126 breaks the bead 300 of the tire 111T from the wheel 111W with the wheel 111W mounted in situ on the vehicle 110; while in other aspects, the tire bead breaker tool 129H on articulation of the at least one robotic arm 126 breaks the bead 300 of the tire 111T from the wheel 111W with the wheel 111W removed from (i.e., located off of) the vehicle 110.

The wheel cleaning tool 129I has any suitable configuration for cleaning the wheel 111W. For non-limiting exemplary purposes only the wheel cleaning tool 129I includes an end effector mount that couples the wheel cleaning tool 129I to the end effector 128 of the at least one robotic arm 126. The wheel cleaning tool 129I includes one or more of brushes, sponges, towels, spray nozzles, etc. that engage the wheel 111W to remove dirt, grime, and grease from the wheel 111W. The wheel cleaning tool 129I is positioned relative to the wheel 111W through articulation of the at least one robotic arm 126, which is guided by sensor information from any suitable sensors such as those described herein, to effect cleaning the wheel 111W. In other aspects the wheel cleaning tool 129I has any suitable configuration and/or components for cleaning the wheel. The wheel cleaning tool 129I may clean the wheel 111W with the wheel 111W mounted in situ on the vehicle 110 or with the wheel 111W removed from (i.e., located off of) the vehicle 110.

The lug wrench 129J has any suitable configuration for installing or removing lug bolts 350 or lug nuts 351 from the wheel hub so as to remove or install the wheel 111W and tire 111T (or tire assembly 111) from and to the vehicle 110. In one aspect, the lug wrench 129J may be substantially similar to those described in U.S. Pat. Nos. 5,125,298 and 9,757, 828, and United States pre-grant publication 2017/0334073, the disclosures of which were previously incorporated herein by reference in their entireties. Here, any suitable sensors, such as those described herein, are employed to identify positions and orientations of the lug bolts 350 or lug nuts 351. Based on the identified position and orientation of the lug bolts 350 or lug nuts 351, the lug wrench 129J, through articulation of the at least one robot arm 126, threads or unthreads the lug bolts 350 or lug nuts 351 onto the wheel hub of the vehicle 110. In other aspects the lug wrench 129J has any suitable configuration and/or components for installing or removing the lug bolts 350 or lug nuts 351.

The tire balancing bead dispenser 129K has any suitable configuration for inserting tire balancing beads inside the tire 111T before the tire bead 300 is seated on the flange 310 of the wheel 111W. For non-limiting exemplary purposes only the tire balancing bead dispenser 129K includes an end effector mount that couples the tire balancing bead dispenser 129K to the end effector 128 of the at least one robotic arm 126. For exemplary purposes only, in one or more aspects, the tire balancing bead dispenser 129K includes any suitable hopper from which loose tire balancing beads are dispensed into the tire 111T. The tire balancing bead dispenser 129K is positioned relative to the tire 111T and wheel 111W through articulation of the at least one robotic arm 126, which is guided by sensor information from any suitable sensors such as those described herein, to effect dispensing of the tire balancing beads (such as through a nozzle) into the tire 111T. As another example, in one or more aspects, the tire balancing bead dispenser 129K includes any suitable hopper in which pre-packaged bags of tire beads are stored. In this example, a robotic arm 126, 126A of the bot 120 is configured to remove an appropriate number of the pre-packaged bags of tire beads from the hopper for insertion into the tire 111T without breaking the bags, where the bag breaks apart from vehicle motion (e.g., after the tire is installed on the vehicle and the vehicle is driven) releasing the tire beads, and where the bag disintegrates completely over time. In other aspects the tire balancing bead dispenser 129K has any suitable configuration and/or components for dispensing the tire balancing beads into the tire 111T. In one aspect, the tire balancing bead dispenser 129K is configured to dispense tire balancing beads into the tire 111T with the wheel 111W mounted in situ on the vehicle 110 and prior to seating the tire bead 300 of the tire 111T against the wheel 111W; while in other aspects, the tire balancing bead dispenser 129K is configured to dispense tire balancing beads into the tire 111T with the wheel 111W removed from (i.e., located off of) the vehicle 110 and prior to seating the tire bead 300 of the tire 111T against the wheel 111W.

The tire inflation tool 129L has any suitable configuration for inflating tire 111T (which sets the tire bead 300 to the wheel flange 310). For non-limiting exemplary purposes only the tire inflation tool 129L includes an end effector mount that couples the tire inflation tool 129L to the end effector 128 of the at least one robotic arm 126. In one or more aspects, the tire inflation tool includes a valve nozzle substantially similar to a conventional tire inflator that couples with the valve stem for inflating the tire 111T. As may be realized, a compressed air source (e.g., tank, compressor, etc.) is coupled to the valve nozzle to provide air (or nitrogen or other gas) to inflate the tire 111T. The tire inflation tool 129L is positioned relative to the valve stem 2100 through articulation of the at least one robotic arm 126, which is guided by sensor information from any suitable sensors such as those described herein, to effect inflation of the tire 111T. In one or more other examples, the tire inflation tool 129L comprises a bead blaster nozzle. The bead blaster nozzle is positioned at a seam between the tire bead and the wheel flange in a manner similar to that described above. The bead blaster nozzle releases (from the compressed air source noted above) a short but high volume "blast" of gas (air, nitrogen, etc.) inside of the tire at the seam to rapidly inflate the tire and seat the bead against the wheel flange. In one or more other examples, the bead blaster nozzle is used in tandem with the valve nozzle where the bead blaster nozzle seats the bead and the valve nozzle adjusts the pressure inside the tire to a predetermined specified pressure (such as specified by the vehicle manufacturer or tire manufacturer). In other aspects the tire inflation tool 129L has any suitable configuration and/or components for inflating the tire 111T. In one aspect, the tire inflation tool 129L on articulation of the at least one robotic arm 126 inflates/seats the bead of the tire 111T mounted to the wheel 111W with the wheel 111W mounted in situ on the vehicle 110; while in other aspects, the tire inflation tool 129L on articulation of the at least one robotic arm 126 inflates/seats the bead of the tire 111T mounted to the wheel 111W with the wheel 111W removed from (i.e., located off of) the vehicle 110.

The tire balancer 129M has any suitable configuration for balancing the wheel assembly 111. For non-limiting exemplary purposes only tire balancer 129M includes an end effector mount that couples the tire balancer 129M to the end effector 128 of the at least one robotic arm 126. The tire balancer 129M is configured to equalize a combined weight of the tire 111T and the wheel 111W with the tire 111T and wheel 111W (i.e., wheel assembly 111) spinning at wheel operating speeds of about 60 mph or greater (in other aspects the operating speeds may be less than about 60 mph). In one aspect, the tire balancer 129M is configured to balance the wheel assembly 111 off of the vehicle 110 and may be substantially similar to a conventional tire balancer but carried by the at least one robotic arm 126; while in other aspects, the tire balancer 129M is configured to balance the wheel assembly 111 on or in situ the vehicle 110 and includes rollers that drive rotation of the wheels assembly 111 for determining where to place wheel weights, and a wheel weight dispenser (such as one of the robotic arm 126, 126A that picks wheels weights from a hopper and applies them to the wheel in locations identified by the tire balancer 129M) to place the wheels weights onto the wheel 111W. In other aspects the tire balancer 129M has any suitable configuration and/or components for balancing the wheel assembly 111.

Referring again to FIGS. 1 and 10, the tire changing system 100 includes a control architecture 1000 having a control console 1010 (including suitable processors and memory for controlling aspects of the tire changing system 100 as described herein—noting the memory is any suitable memory accessible by the processors such as a memory resident within the tire changing system 100 or a cloud based memory as described herein) communicably connected (e.g., wirelessly, through wires, is carried by, or remotely located) to the devices 1020A-1020n. In the aspect illustrated in FIG. 1 the control console 1010 is disposed on the floor 198 and is remotely connected (through wither a wired or wireless connection) to the devices 1020A-1020n. Referring to controller 160 of the bot 120, for exemplary purposes, the controller 160 (including suitable processors and memory 161 for controlling operations of the bot 120 as described herein) is in communication with the control console 1010 and is communicably connected (e.g., wirelessly, through wires, is carried by, or remotely located) to the carriage drive section 121 and the bot drive section 127 so as to effect traverse of the bot 120 along the traverse path effecting dynamic positioning of the at least one robotic arm 126 relative to a variable position of the vehicle 110 with the wheel 111W or tire 111T mounted thereon. For example, in a service facility the vehicle service technician 199 drives the vehicle 110 into a service bay. As may be realized, there is nothing to locate the vehicle 110, in the service bay, at any particular location (e.g., the vehicle may never be located in the same place twice) such as would be the case in a vehicle assembly line where the vehicle is carried by a conveyor and stopped at designated/predetermined positions (with respect to assembly automation) for assembly operations. Moreover, vehicles that are serviced in service facilities have varying wheel bases, varying wheel tracks, varying ride heights, varying camber, varying caster, etc. from vehicle to vehicle (e.g., many different makes and models of vehicles are serviced in the same service bay in any given amount of time one after the other), unlike in a vehicle assembly line where assembly operations are performed on the same make and model vehicle. As such, in service facility operations, within any given service bay (e.g., tire changing station 101), the vehicle 110 (and the components thereof) has a dynamically varying position (that changes from vehicle to vehicle, or even for the same vehicle each time that vehicle is driven into and parked within the service bay) with respect to the tools/machines within the tire changing station 101. Here, the dynamic positioning of the at least one robotic arm 126 relative to the variable position of the vehicle 110 with the wheel 111W or tire 111T mounted thereon is disposed so that articulation of the at least one robotic arm 126 engages the wheel or tire engagement tool 129 to the wheel 111W or tire 111T on the vehicle 110 in the variable position.

For determining the variable position of the vehicle 110, the automated tire changing system 100 includes any suitable electromagnetic radiation and/or optical mapping sensors (e.g. laser scanners, 3-D time of flight cameras, etc.) so as to map the tire changing station 101, or at least a portion thereof, for improved automation positioning relative to the vehicle. For example, in one aspect, the automated tire changing system 100 includes a vision system 162 having any suitable number of cameras 163, 163A, 163B positioned around or within (in some aspects one or more of the cameras are mounted on the bot 120 as described below) the tire changing station 101 for detecting and reconstructing the tire changing station 101 environment to facilitate robotic interaction with vehicle 110 where the controller receives information/data from the vision system 162 and determines a three-dimensional (3-D) virtual environment where the 3-D virtual environment could represent the tire changing station 101, in which the bot 120 operates, including a plurality of 3-D virtual objects corresponding to respective physical objects (e.g., the vehicle 110, tires 111T, wheels 111W, lift 170, bots 120 and other features of the tire changing station 101 as described herein) in the physical environment. The controller could also determine two dimensional (2-D) images of the tire changing station 101 including 2-D depth maps. The controller determines portions of the 2-D images that correspond to a given one or more physical objects, such as the bot 120, the tires 111T, and the wheels 111W where 3-D models of the bot 120, tires 111T, and wheels 111W are generated based on the portion and the 2-D depth maps. The controller instructs the bot 120 to engage the tires 111T and wheels 111W for changing the tires 111T as described herein. In one aspect, the virtual environment is updated/generated from real time three dimensional imaging data (e.g. point cloud data) from the vision system 162.

The vision system 162, of the automated tire changing system 100, informs and enables the controller 160 so as to provide, real time command inputs to the bot(s) 120 that are responsive, in real time to variances in vehicle 110 position, variances in wheel assembly 111 (and components thereof as described herein) position, variances in tire 111T position, variances in wheel position 111W, and variances in positions other features of the automated tire changing system 100 (referred to herein as "tire changing variances") so that the bot(s) 120 is/are adaptive in real time resolving tire changing variances, affecting the tire changing process, (automatically and/or in cooperation/collaboration with vehicle service technician 199 assistance) in a time optimal manner so as to effect the tire change process in time optimal manner. The adaptive tire changing automation, facilitated by the real time vision system assistance, is also responsive to identify and correct deviant tire changing conditions (automatically and/or in cooperation/collaboration with user assist) obstructing or impeding time optimal tire changing process.

The cameras 163, 163A, 163B are configured so as to effect three-dimensional imaging of each wheel assembly 111 and respective portion of the vehicle 110 and track, in the real-time updated three-dimensional image, a position of the bot 120 and the assembly and disassembly (e.g., tire changing) process of the wheel assembly 111 (e.g., the wheel 111W, tire 111T, valve stem 2100, valve stem cap 2101, etc.). The cameras 163A-163D (see FIG. 2B) may be placed so as to image four corners of the vehicle 110 so as to three dimensionally map substantially an entirety of the tire changing station 10 (e.g., each camera has a field of view to image at least two sides of the vehicle 110) for resolving the features of the bot 120 and the wheel assemblies 111 (and the components thereof). As noted above, the different vehicles 110 serviced by the tire changing station 101 are not located in a predetermined location and the position of each vehicle 110 driven into the tire changing station 101 varies as noted above. The controller 160, based on imaging data obtained from the vision system 162, is configured to register the variable position of the vehicle 110, register a variable position of the wheel 111W or tire 111T on the vehicle 110 (noting the variable position that may change during the tire changing operation, such as due to vehicle suspension movement, steering movement, wheel hub rotation, etc.) defined by the variable position (e.g., record the position within the tire changing station 101 of the vehicle 110, each tire 111T to be changed, and each wheel 111W corresponding to the tire 111T to be changed in the memory 161 for later access when commanding bot 120 movements), or register a position of a label or other marker 377 placed on the wheel 111W or tire 111T by, for example, the service technician 199. The label or marker 377 is, in one or more aspects, a removable barcode or symbolic label that is applied to each wheel 111W (or in some aspects to a fender of the vehicle 110 above or adjacent to a respective wheel 111W) to indicate, upon recognition by one or more of the vision systems described herein, where the bot 120 should "look" for each wheel. The label or marker 377 reduces time spent by the vision system(s) to scan and identify the wheel assemblies 111 and parts thereof.

In one or more aspects, a vision system 130 is configured not necessarily to image the bot 120 or surface/tracks upon which the bot 120 traverses, but rather the vision system 130 is configured to image the wheel 111W and/or tire 111T (e.g., the wheel assembly 111 or components thereof), with the bot 120 making adjustments based on information from the vision system 130 in real time. For example, the bot 120 includes the vision system 130, which vision system 130 is coupled to the controller 160. The vision system 130 includes one or more cameras 131 mounted to the at least one robotic arm 126 and the carriage 120C. The vision system 130 and cameras 131 are substantially similar to vision system 162 and cameras 163 described above; however, here the one or more cameras 131 are mounted on the bot 120 for creating the 3-D map of at least a portion of the tire changing station 101. In one aspect, the bot 120 may traverse around the periphery/perimeter (or a portion thereof) of the tire changing station 101 so as to map one or more sides of the vehicle to effect a tire change as described herein. In other aspects, the vision system 130 may dynamically map a localized portion of the tire changing station 101 in which the bot 120 operates, where the localized portion of the tire changing station mapped by the vision system 130 is dynamically updated in real time as the bot 120 moves within the tire changing station 101. In still another aspect, the vision system 130 may be collaborative with vision system 162 so that data from both visions systems 130, 162 is used by the controller 160 to globally map the entire tire changing station 101 (e.g., from vision system 162 data) and locally map a portion of the tire changing station 101 (e.g., from vision system 130 data). In one aspect, the controller 160, based on imaging data obtained from the vision system 130, is configured to register the variable position of the vehicle 110, or register a variable position of the wheel 111W or tire 111T on the vehicle 110 defined by the variable position (e.g., record the position within the tire changing station 101 of the vehicle 110, each tire 111T to be changed, and each wheel 111W corresponding to the tire 111T to be changed in the memory 161 for later access when commanding bot 120 movements).

In one aspect, the carriage 120C has any suitable positioning sensors 132, and the controller 160 is configured to register the variable position of the vehicle 110, or register a variable position of the wheel 111W or tire 111T on the vehicle 110 defined by the variable position based on data from the positioning sensors 132. In one aspect, the positioning sensors may be any suitable sensor including, but not limited to, sonic sensors, light detection and ranging sensors, or any other suitable ranging sensors configured to effect determination of a spatial positioning between objects. In one aspect, the positioning sensors 132 may be used in conjunction with one or more of the visions systems 130, 162; while in other aspects one or more of the vision systems (such as vision system 130) forms at least one sensor of the positioning sensors 132.

With reference to FIGS. 1 and 3, at least one of the vision systems 130, 162 is configured to identify a lug pattern 366 (i.e., the layout of the wheel mounting holes expressed as the number of lugs by the diameter of the imaginary circle 366C formed by the center of the lugs) of the wheel 111W. At least one of the vision systems 130, 162 is configured to identify a size (e.g., a head size so as to select a corresponding socket or wrench for removal/installation) of lug bolts 350 or lug nuts 351 coupling the wheel 111W to the vehicle 110. Identifying the lug pattern 366 and size of the lug bolts 350 or lug nuts 351 provides for selection of or automated adjustment, for example, the lug wrench 129J to effect removal or installation of the wheel 111W (and wheel assembly 111) from or to the vehicle 110.

With reference to FIGS. 1 and 3, in one aspect, at least one of the vision systems 130, 162 is configured to, with the controller 160, read tire sidewall information 371 of the tire 111T mounted to the wheel 111W (with the wheel 111W mounted in situ on the vehicle 110 or removed from (i.e., located off of) the vehicle 110) to identify tire information (e.g., tire size, max inflation pressure, speed rating, direction of rotation, etc.) and/or department of transportation (DOT) codes/information. Identification of the information provides for selection of and verification of a replacement tire for installation on the wheel 111W. In one aspect, at least one of the vision systems 130, 162 is configured to, with the controller 160, identify a make and model of the vehicle 110 to effect retrieval of original equipment (OEM) tire information for the vehicle 110 from a memory (e.g., stored in a database within memory 161 or a memory otherwise accessible by the controller 160). Identification of the vehicle make and model and retrieval of the OEM tire information provides for selection of and verification of a replacement tire 111TN for installation on the wheel 111W. In one aspect, at least one of the vision systems 130, 162 is configured to, with the controller 160, inspect the wheel 111W for one or more of damage 333 (FIG. 3; e.g., bent wheel flanges, cracks, etc.) and corrosion 334 (FIG. 3; e.g., pitting, rust, etc.) so that the wheel is cleaned, repaired, or replaced depending on an extent of the damage and/or corrosion. One or more of the above "inspections" may be performed during a tire change with the wheel 111W mounted in situ on the vehicle 110 or with the wheel 111W removed (i.e., located off of) from the vehicle 110.

Figure 2A:
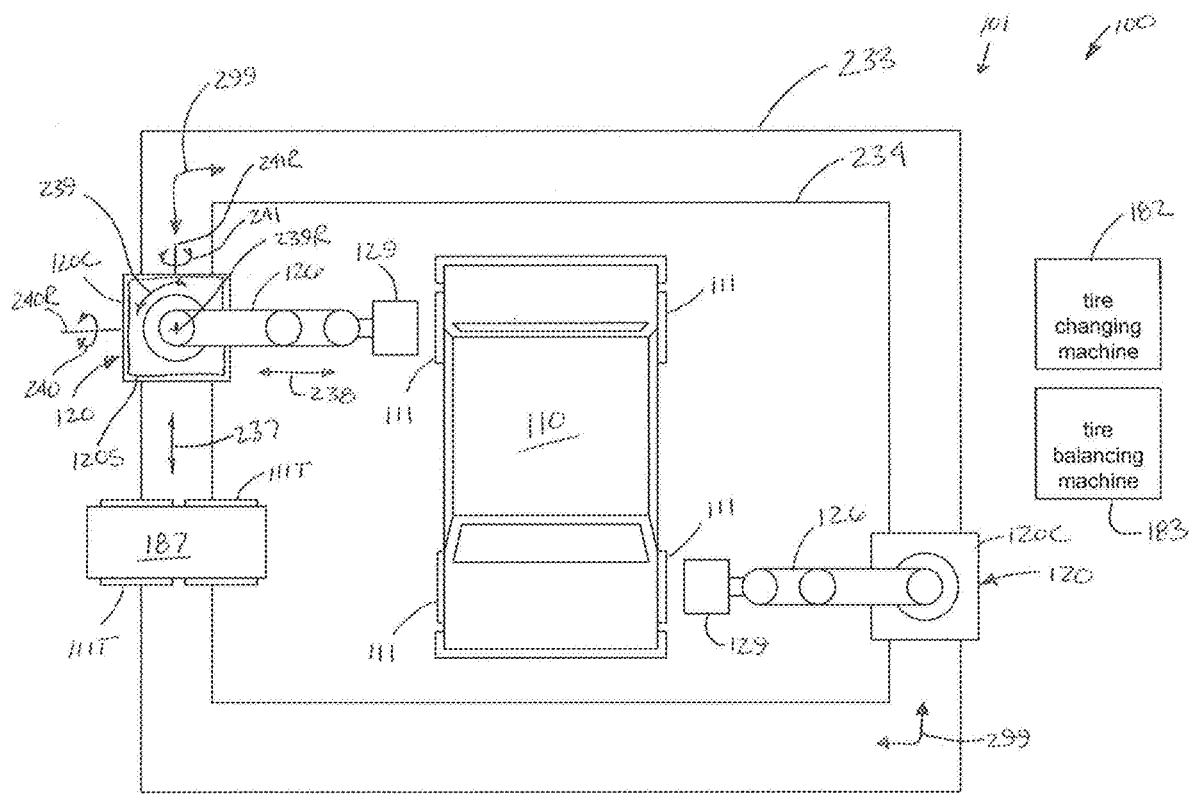
FIG. 2A is another schematic illustration of the automated tire changing system of FIG. 1 incorporating aspects of the present disclosure.

In one aspect, at least one of the vision systems 130, 162 is configured to, with the controller 160, read tire sidewall information 371, which in one or more aspects includes department of transportation (DOT) codes/information, of a replacement or new tire 111TN to verify the replacement or new tire 111TN is a correct size based on one or more of the identified tire information and the original equipment tire information. In one aspect, at least one of the vision systems 130, 162 is configured to, with the controller 160, read tire sidewall information 371 of the replacement or new tire 111TN to verify a rotation direction of the replacement or new tire so that the replacement or new tire 111TN is installed properly on the vehicle 110. In one or more aspects, the department of transportation (DOT) codes/information read by the vision system is associated with the vehicle 110 on which the tires are mounted and stored in any suitable database, such as for example a database in memory 161 (or other suitable memory) in associated with the vehicle information (e.g., vehicle identification number, make, model, etc.), Referring to FIGS. 1 and 2A, and as noted above, the bot 120 traverses the floor 198, in one or more aspects, without physical constraints (e.g., the carriage 120C is configured for autonomous guidance and unrestricted traverse on an undeterministic surface 198S of the traverse surface or the floor 198). FIG. 2A illustrates an example where two bots 120 are illustrated (in other aspects there may be more or less than two bots 120) traverse the floor 198 without physical constraints and along a traverse path 299. The traverse path 299 may be defined in any suitable manner such as with one or more guidelines 233, 234 disposed on the floor 198. In one aspect, the positioning sensors 132 on the carriage 120C include line following sensors configured to identify the guidelines 233, 234 so that the bot 120, under control of controller 160, travels the traverse path 299 along the guideline(s) 233, 234. In the example shown in FIG. 2A the traverse path 299 extends around a perimeter of the tire changing station 101 so as to extend around and allow for bot 120 travel around all four sides of the vehicle 110. In other aspects, the bot(s) 120 are configured to traverse along the traverse path 299 using any suitable form of navigation. For example, referring also to FIGS. 5-8, in one aspect the bot 120 includes a navigation system 133 configured for one or more of simultaneous location and mapping (SLAM) navigation, beacon navigation, markers and beacon navigation, and ad hoc route marker navigation.

Figure 5:
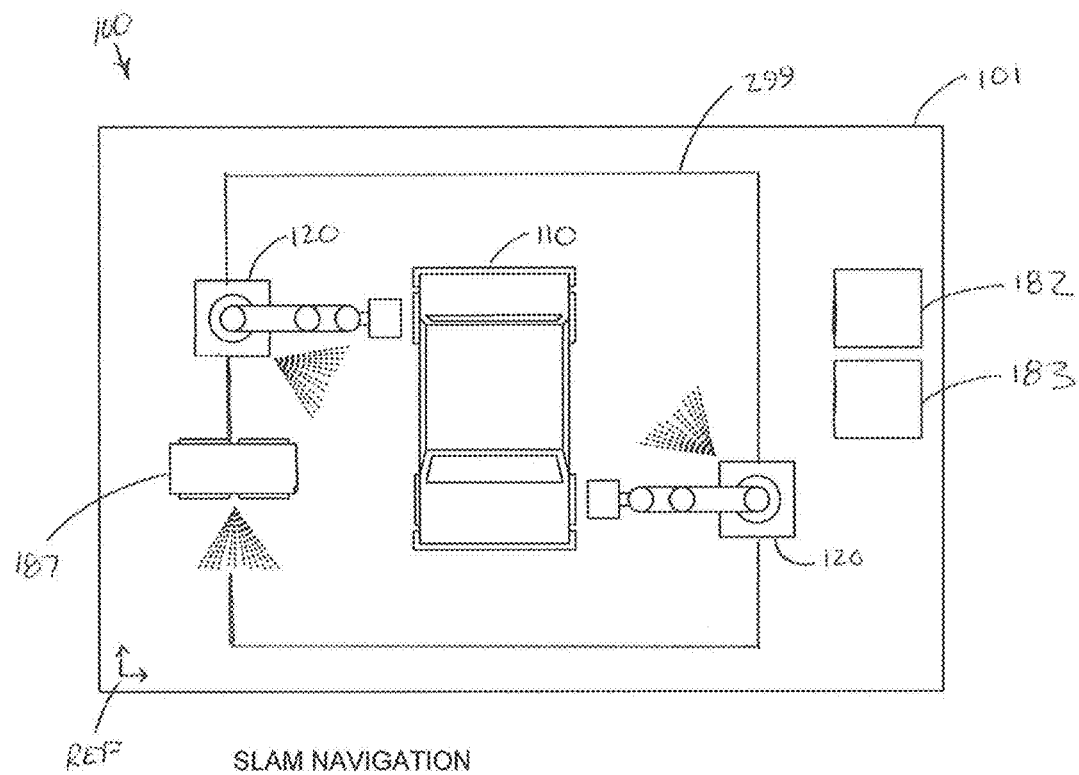
FIG. 5 is a schematic illustration of automated guided vehicle navigation in accordance with aspects of the present disclosure.

Referring also to FIG. 5, in one aspect the navigation system 133 includes a SLAM navigation system that provides the bot 120 a global coordinate or reference frame REF with respect to the tire changing station 101. Here the bot 120 guidance is effected through a coordinate system that lacks physical markers or beacons.

Figure 6:
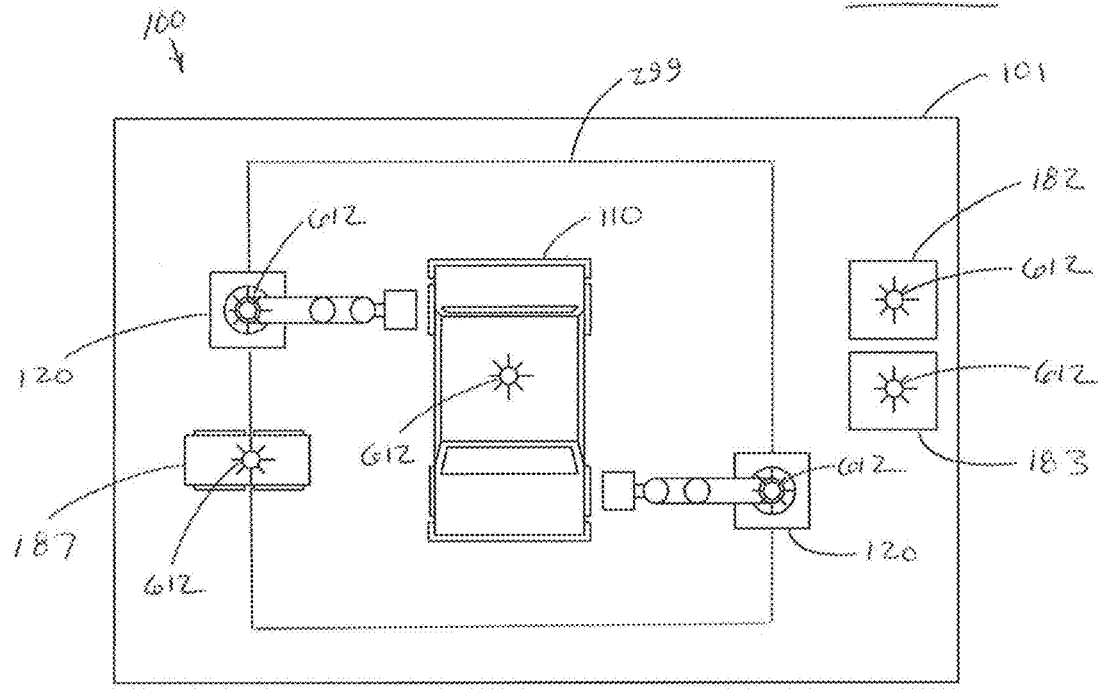
FIG. 6 is a schematic illustration of automated guided vehicle navigation in accordance with aspects of the present disclosure.
Figure 7:
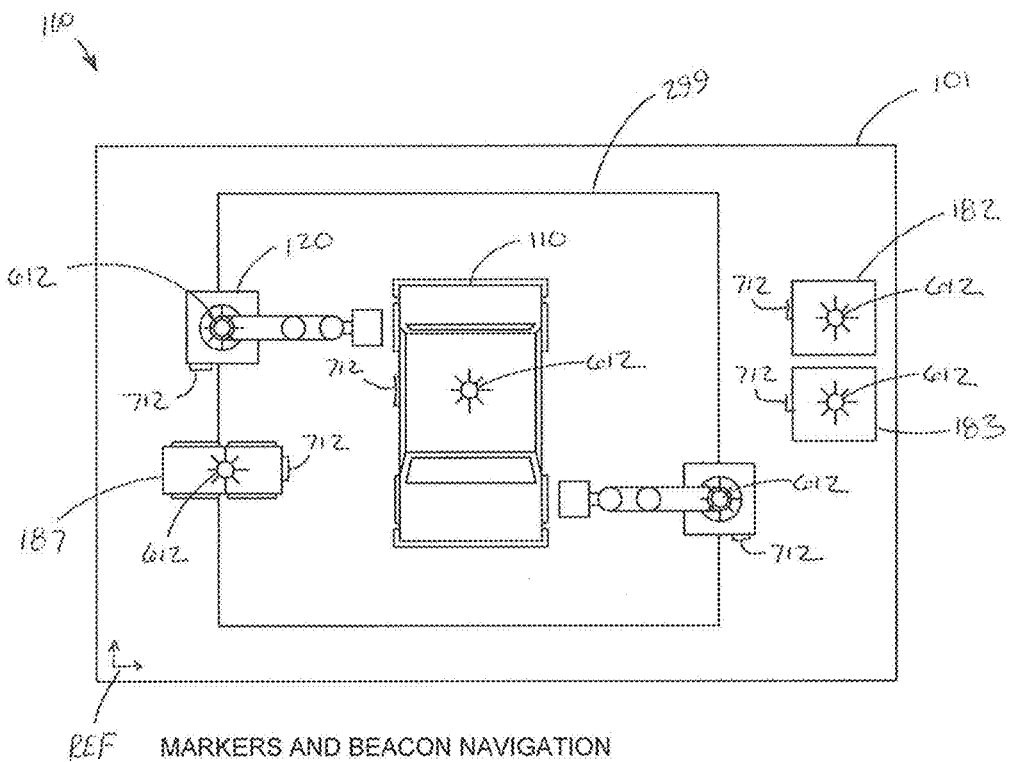
FIG. 7 is a schematic illustration of automated guided vehicle navigation in accordance with aspects of the present disclosure.
Figure 8:
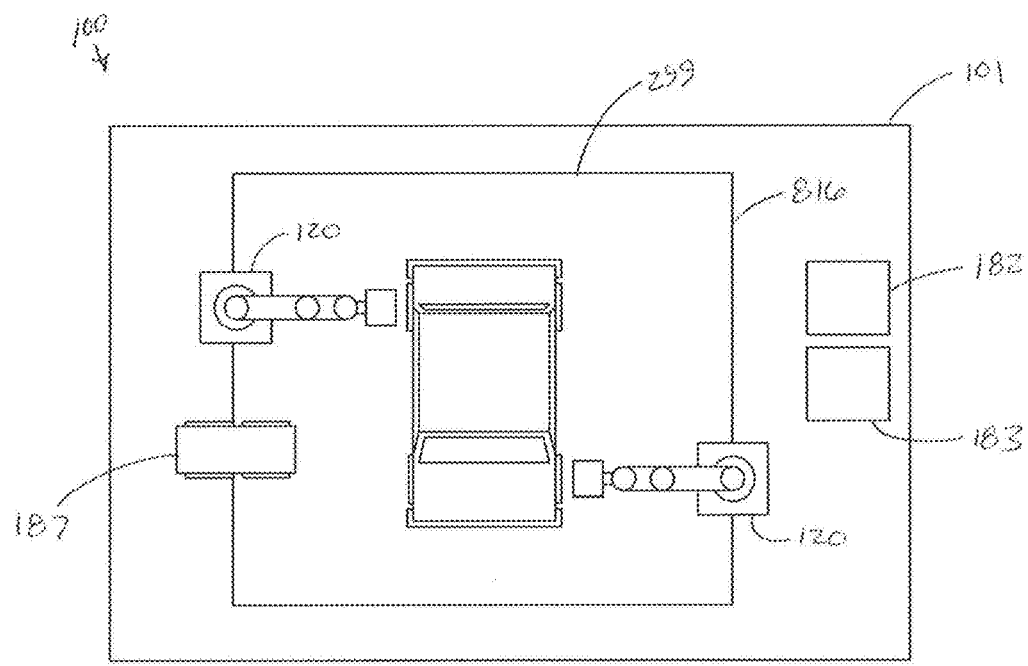
FIG. 8 is a schematic illustration of automated guided vehicle navigation in accordance with aspects of the present disclosure.

Referring also to FIGS. 6-8, in one aspect, the navigation system 133 includes one or more of a marker detecting sensor(s) 133A and/or a beacon sensor(s) 133B. In one aspect the marker detecting sensor(s) 133A are configured to detect the position of a marker such as a retro-reflective tape (or other suitable marker such as a capacitive or inductive marker or other optical marker (referred to as markers 712) including but not limited to barcodes that in one aspect form one or more guidelines 233, 234) laid on the floor 198 (e.g. on the undeterministic traverse surface of the floor) and/or on any other suitable surface such as the walls of the service facility and/or on the vehicle 110 or other components of the tire changing station 101 (e.g., such as on automated or semi-automated tire changing machines 182 and automated or semi-automated tire balancing machines 183, tire storage racks/carts 187, etc.). In one aspect the marker detecting sensor(s) 133A include one or more of a photodiode-based sensor, one or more radiation sources (e.g., LEDs), inductive sensors, capacitive sensors, barcode reader, etc. to detect the marker. In one aspect the beacon sensor 133B includes any suitable transmitter and/or receiver configured to actively or passively detect any suitable radio frequency beacons 612 (or other suitable beacon such as an infrared, laser or other optical beacon). As can be seen in FIG. 6, for example, the navigation system 133 includes a plurality of active (e.g. having a radio frequency or other (e.g., infrared) beacon transmitter) or passive (e.g. configured to passively return a signal) beacons or tags 612 that are located at any suitable location of the tire changing station 101 (e.g., such as on automated or semi-automated tire changing machines 182 and automated or semi-automated tire balancing machines 183, tire storage racks/carts 187, etc.). In this case, the beacon sensor(s) 133B are configured to detect signals from beacons or detect the beacons themselves for locating the bot 120 relative to the vehicle 110 or any other component of the tire changing station 101 (e.g., such as other bots 120, automated or semi-automated tire changing machines 182 and automated or semi-automated tire balancing machines 183, tire storage racks/carts 187, etc.). By way of example, where beacons 612 are used, each bot 120 should secure a line of sight to one or more beacons 612, for example, an origin and/or destination beacon could be visible (either optically or through radio waves) to the bot 120 for at least a period of time. The bot 120 moves directly from one beacon (e.g. the origin beacon) toward the other (e.g. the destination beacon) unless an obstacle intervenes at which time the bot positioning sensors 132 or vision system 130 may provide the controller with suitable data for avoiding the obstacle and continuing along the traverse path 299. In one aspect each beacon 612 establishes a respective coordinate system, where the beacon is the origin of the respective coordinate system. Angular encoding (or any other suitable encoding) is employed to specify the axes of the beacon coordinate system. Angle encoding can also enable other useful properties.

Referring to FIG. 7, in one aspect, the navigation system 133 includes shorter range active or passive beacons 612 (which are substantially similar to those described above) and pathways established by any suitable markers 712 (such as those described above) attached to, for example, the floor and/or other suitable surface such as walls of the service facility and/or on the vehicle 110 and/or other components of the tire changing station 101 (e.g., such as on automated or semi-automated tire changing machines 182 and automated or semi-automated tire balancing machines 183, tire storage racks/carts 187, etc.), so that the bot(s) 120 are provided with a rough global reference frame REF. Here the beacon 612 and marker 712 arrangement simplifies sensor range requirements compared to SLAM navigation.

Referring also to FIG. 8 the navigation system 133 includes, in one aspect, an ad hoc marker system including one or more markers 816 laid on the floor and/or other suitable surface (such as walls of the service facility and/or on the vehicle 110 or other components of the tire changing station 101 (e.g., such as on automated or semi-automated tire changing machines 182 and automated or semi-automated tire balancing machines 183, tire storage racks/carts (also referred to as supply carts) 187, etc.)), in some cases temporarily. A route marker 816 indicating a bot 120 traverse path 299 is employed in situations where either a line of sight between beacons does not exist or traveling in a straight path between beacons is not desired. For example, a route marker enables a bot 120 to avoid an obstacle within the tire changing station 101. As may be realized, the bot 120 can illuminate, for example, a tape or line using, e.g., conventional infrared (IR) light emitting diodes (LEDs). In one aspect, the bot 120 detects the tape or line using a position-sensitive detector (e.g., of the positioning sensors 132) composed of discrete components (i.e., not a camera) to servo on the tape or line. The detector measures the degree of retro-reflectivity in view to eliminate false positives. In one aspect, the bot 120 servo on the line directly. In one aspect, the bot 120 can servo at any selected offset with respect to the line. Offset servoing enables two important properties. When placing the line to mark the bot 120 traverse path 299, vehicle service technicians 199 need not allow space between the line and objects (such as the vehicle, semi-auto automated or mated tire changing machine 182, automated or semi-automated tire balancing machine 183, etc.). Any time the bot 120 finds its path partially blocked by an object, the bot 120 will increase its offset from the line so that it can follow the line without colliding with the object. A second feature enabled by offset following allows two bots 120 that meet while traveling along the line in opposite directions to avoid collision. When the bots 120 determine that a collision is imminent, each can offset its position relative to the line. The bots 120 can thus pass without obstructing each other.

As may be realized, in one aspect the bot(s) 120 employs one or more of the navigation systems described herein for navigating the tire changing station 101 and transporting tires 111T, wheel assemblies 111, wheels 111W, etc. from one location to another. In other aspects, the bots 120 include any suitable locating system, such as internal GPS that locates the bot 120 within the tire changing station 101 space such that the bot 120 and/or controller 160 knows where the location and pose of the bot 120 is within the tire changing station 101 as desired.

Figure 2B:
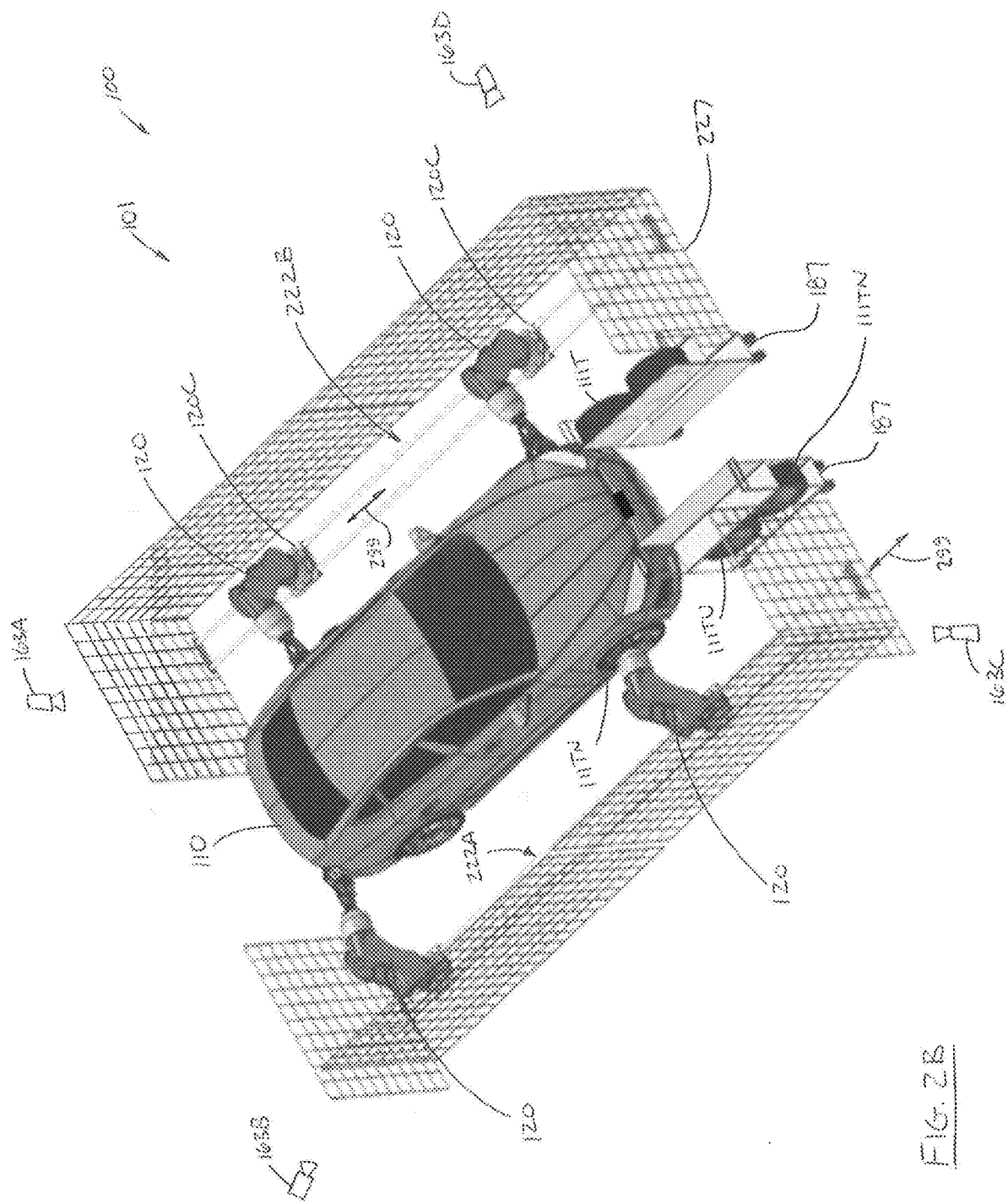
FIG. 2B is still another schematic illustration of the automated tire changing system of FIG. 1 incorporating aspects of the present disclosure.
Figure 2D:
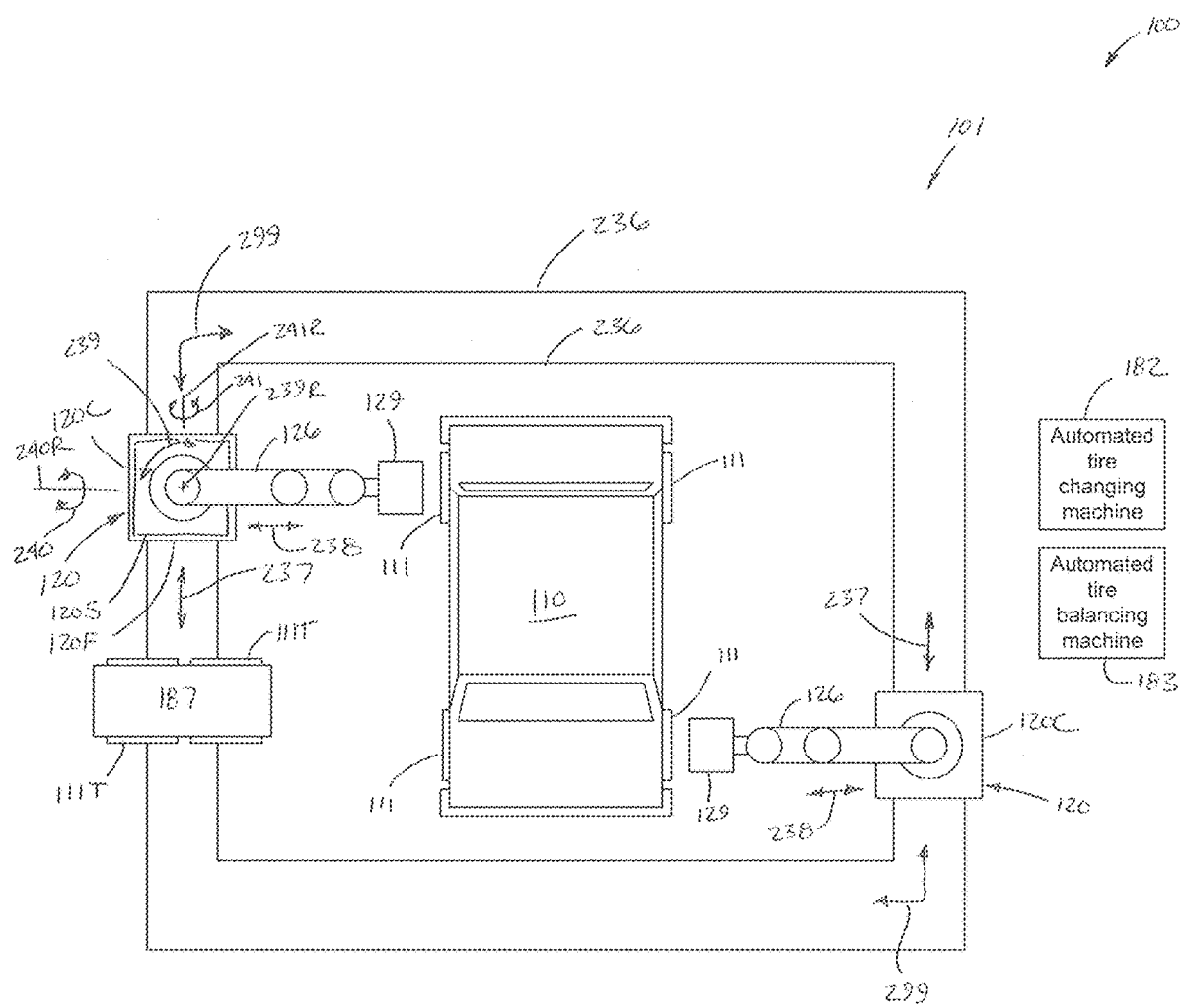
FIG. 2D is another schematic illustration of the automated tire changing system of FIG. 1 incorporating aspects of the present disclosure.

In one or more aspects, referring to FIG. 2D, navigation of the bot 120 is simplified by providing one or more rails or tracks 236 and configuring the carriage 120C to travel along the rails 236. For example, referring to FIGS. 1 and 2D, the bot 120 traverses the rails 236 which are disposed along one or more sides of the vehicle 110. In one or more aspects, carriage 120C is configured as a multi-stage carriage (in a manner similar to that described above) that moves as a unit (i.e., all stages of the multi-stage carriage move together) in direction 237 along the rail(s) 236 and a stage of the carriage 120C moves in direction 238 in a direction transverse to the rail(s) 236 so that the at least one robotic arm 126 is moved, by the stage towards and away from the vehicle independent of movement of the at least one robotic arm 126. FIG. 2D illustrates an example where two bots 120 are illustrated (in other aspects there may be more or less than two bots 120) traversing the floor 198 along the traverse path 299 and being guided by rail(s) 236. In this aspect, the traverse path 299 is defined by the rail(s) 236. In the example shown in FIG. 2D the traverse path 299 extends around a perimeter of the tire changing station 101 so as to extend around and allow for bot 120 travel around all four sides of the vehicle 110.

Referring to FIGS. 1, 2B, and 2C, in one aspect, as noted above, the bot(s) 120 are configured to traverse along the traverse path 299 via physical constraints (e.g., the carriage 120C is rail or track guided). Non-limiting examples of the tire changing station 101 with bots 120 having carriages 120C that are track guided as shown in FIGS. 2B and 2C. In FIG. 2B, the tire changing station 101 includes sets of tracks 222A, 222B extending along the driver and passenger sides of the vehicle 110. Each set of tracks 222A, 222B has two bots 120 disposed thereon (in other aspects there may be more or less than two bots 120) for travelling along a respective traverse path 299 defined by the respective set of tracks 222A, 222B. In this aspect, the tire changing system 100 includes supply carts 187 (which will be described in greater detail herein) on which tires (replacement tires or tires removed from the vehicle) are stored. The bots 120 are configured to pick and place tires 111T from and to the supply carts 187 for effecting a tire change. The bots 120 in this example (as well as the other examples described herein where there are multiple bots 120) are, in one aspect, configured to collaboratively work with each other such as to pass tires 111T from the carts 187 to bots 120 that may not have access to the carts 187 due to, for example, a configuration of the tracks 222A, 222B (or for any other suitable collaborative tire changing tasks).

FIG. 2C illustrates a tire changing station 101 having a single bot 120 (in other aspects there may be more than one bot 120) traversing along a set of tracks 222 that extends along both the passenger and driver sides of the vehicle 110 allowing the single bot 120 to change all four vehicle tires. Referring also to FIG. 1, in this example the tire changing system 100 includes automated or semi-automated tire changing machine(s) 182 and automated or semi-automated tire balancing machine(s) 183 where the bot 120 is configured to remove a wheel assembly 111 from the vehicle and transport the wheel assembly 111 to the tire changing machine 182. Here, the end effector 128, with the wheel or tire engagement tool 129 coupled thereto, on articulation of the at least one robotic arm 126 is configured to place the wheel 111W, with the tire 111T mounted thereto, on the automated (or semi-automated) tire changing machine. In the case of removing the tire 111T from the wheel 111W, the bot end effector 128 is configured to remove the tire 111T (e.g., a used or old tire 111TU), uninstalled from the wheel 111W by the automated (or semi-automated) tire changing machine 182, from the tire changing machine 182. In the case of installing the tire 111T to the wheel 111W, the end effector 128 is configured to place another tire 111T (e.g., a replacement tire 111TN) on the automated (or semi-automated) tire changing machine 182 for installation of the other tire 111TN to the wheel 111W by the tire changing machine 182. The end effector 128, with the wheel or tire engagement tool 129 coupled thereto, on articulation of the at least one robotic arm 126 is configured to place the wheel 111W, with the other tire 111TN mounted thereto, on the automated (or semi-automated) tire balancing machine 183. Here, in one or more aspects, one of the robotic arms 126, 126A picks wheels weights from a hopper and applies them to the wheel in locations identified by the tire balancing machine 183. Once balanced the wheel assembly 111 may be installed on the vehicle 110 by the bot 120.

As may be realized (and shown in FIGS. 1, 2A, and 5-8) the tire changing system 100 is configured, in some aspects, to provide both in situ tire changes with the wheel 111W mounted in situ on the vehicle 110 and tire changes performed by the tire changing machine(s) 182 and tire balancing machine(s) 183 with the wheel 111W removed (i.e., located off of) the vehicle 110. The configuration of the tire changing system 100 between in-situ tire changes and tire changes with the wheel 111W removed from the vehicle may be effected through the control console 1010. For example, as noted above, the vehicle service technician 199 may select an in-situ tire change and/or a tire change with the wheel 111W removed from the operator graphical user interface 1004. The operator graphical user interface 1004, in one aspect, is also configured to allow the vehicle service technician 199 to select which tires (e.g., passenger front, passenger rear, drive front, or drive rear) are to be changed in-situ or by removing the wheel 111W so that in-situ and removed wheel tire changes are performed on a common vehicle.

The control console 1010 is also configured, such as through inputs on the operator graphical user interface 1004, so that the vehicle service technician 199 selects which tire change operations are to be performed. For example, the vehicle service technician 199 may select, and the control console 1010 is configured to effect such selection, a type of balancing to be performed on a tire (e.g., wheel weights, tire beads, etc.), whether a valve core is replaced, which tires are to be replaced, the make/model/size of tire to be installed, whether some tire change operations are to be performed manually or in a semi-autonomous manner, etc. In some aspects, there are pre-programmed tire change routines 1061 corresponding to a respective type of vehicle (car, truck, sports car, make, model, etc.), a respective type of wheel or tire, and or a respective customer that are stored in a memory such as database 1060. These pre-programmed tire change routines 1061 are selectable by the vehicle service technician 199 through, for example, the operator graphical user interface 1004 and specify a tire change recipe (which tire change processes are to be performed and whether or not one or more tires are changed in-situ or changed by removing the wheel).

Referring to FIGS. 1, 2A-2C, and 5-8, in one aspect, the automated tire changing system 100 includes supply carts 187 configured to hold tires 111T, wheels 111W, and or wheel assemblies 111. In one or more aspects, one or more of the supply carts 187 are manual carts that are moved from location to location by, for example, the vehicle service technician 199. In one or more other aspects, one or more of the carts 187 is an automated cart having a cart drive section 188, where the cart includes a controller 160' and memory 161', vision system 130', positioning sensors 132', and navigation system 163', which are substantially similar to the controller 160 and memory 161, vision system 130, positioning sensors 132, and navigation system 133 of the bot 120 (noting that manual and automated carts can be used alongside each other). Here, the cart autonomously navigates throughout the tire changing station 101 in a manner substantially similar to that described above with respect to bot 120. In still other aspects, one or more of the carts 187 (such as the manual cart) is configured to be towed by a bot 120 or an automated cart to a predetermined location within the tire changing station 101.

Figure 4:
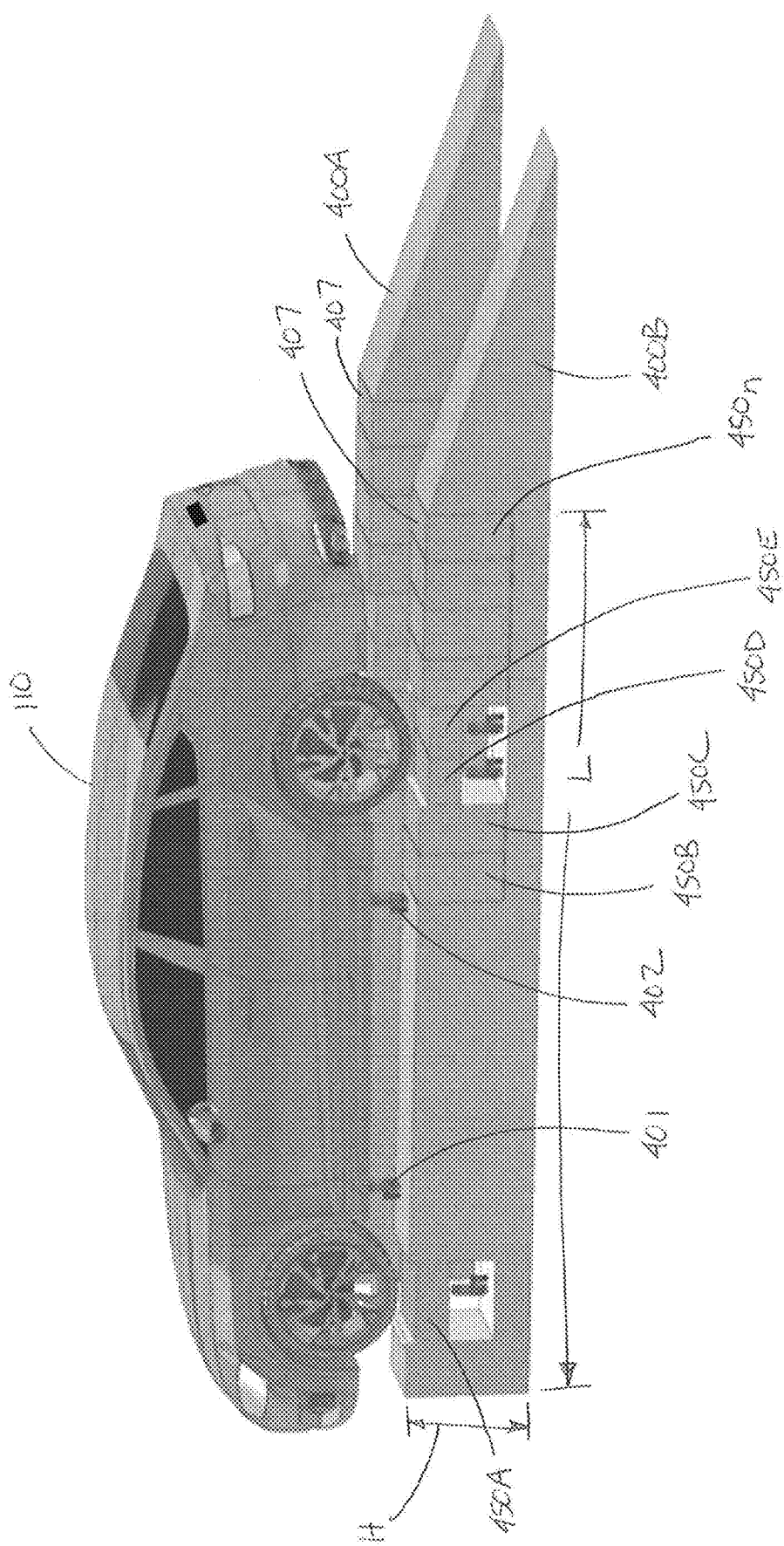
FIG. 4 is a schematic illustration of a portion of the automated tire changing system of FIG. 1 incorporating aspects of the present disclosure.

Referring to FIGS. 1 and 4, the lift 170 of the automated tire changing system 100 is configured to adjust for the variable position of the vehicle 110 as the vehicle is driven into the tire changing station 101. For example, the lift 170 may be a conventional two post lift or other vehicle lift having adjustable arm/supports that are variably positioned underneath the vehicle so that when the lift 170 is actuated the lift 170 moves the vehicle in a vertical direction to raise the tires 111T of the vehicle 110 off of the traverse surface or the floor 198 so as to effect changing of the tire(s) 111T.

In other aspects, as illustrated in FIG. 4, the lift 170 comprises a set of ramps 400A, 400B located within the tire changing station 101. The vehicle 110 is driven onto the ramps 400A, 400B and vehicle supports 401, 402 (only two are shown, although at least four are used) are positioned underneath the vehicle 110. The vehicle supports 401, 402 are any suitable vehicle supports such as jack stands, inflatable air bladders/bags, pneumatic or hydraulic jacks, etc. configured to support the weight of the vehicle 110. Each ramp 400A, 400B includes a plurality of retractable vehicle supports 450A-450n (where "n" denotes an integer larger than 1 that sets an upper bound to the number of retractable vehicle supports) arrayed along the length L of the respective ramp 400A, 400B. Each of the retractable vehicle supports 450A-450n is manually or automatically retractable so as to move vertically downward away from a respective tire 111T so as to remove a normal force exerted on the tire 111T by a tire support surface 407 of the ramps 400A, 400B so as to distance the tire 111T from the tire support surface 407 and effect changing of the tire. As can be seen in FIG. 4, the array of retractable vehicle supports 450A-450n is such that one or more retractable vehicle supports 450A-450n is positioned underneath a tire with the vehicle 110 at any position along the length L of the ramps 400A, 400B (i.e., the vehicle can be variably positioned anywhere along the ramps 400A, 400B). The one or more retractable vehicle supports 450A-450n positioned underneath any one of the vehicle tires can be retracted to effect changing of that tire. The ramps 400A, 400B have a height H that places the vehicle at any suitable vertical position accessible by the bots 120, which may be lower than a height of the vehicle required for manually changing the tires.

As may be realized, the automated tire changing system 100, in one or more aspects, includes fencing or other barriers 227 (see FIG. 2B) to substantially isolate the vehicle service technician 199 from the bots 120 and automated supply carts 187 when in operation. In some aspects, the barriers 227 have any suitable interlock devices that terminate power to specific axes of motion or all axes of motion of the bot 120 (and any other automation of the tire changing system 100) upon opening a door to the barrier 227 and/or entering the barrier 227. In other aspects, the bots 120 and automated supply carts 187 are configured to collaboratively operate with the vehicle service technician 199 so as to hand off tires 111T, wheels 111W, wheel assemblies 111, etc. to/from the vehicle service technician 199.

The control architecture 1000 of the tire changing system 100 is configured to provide for the addition or removal of tire change devices 1020A-1020n and/or service bays in a plug-and-play type manner. For example, the tire change system 100 is scalable so that as service facility demand increases (or for any other reason) additional bots 120, supply carts 187, barriers and other devices 1020A-1020n as described herein can be added to tire changing station 101 to increase throughout without changing the control architecture and providing a centralized control of the devices 1020A-1020n. As an example, the control console 1010 and the devices are configured with a pairing communication mode so that the control console 1010 detects new (to be added) devices 1020A-1020n where upon detection, the control console 1010 receives device type and device configuration information from the device 1020A-1020n and registers the device 1020A-1020n for use in the tire changing system 100. The sensors onboard the devices 1020A-1020B and/or vision system 162 may facilitate calibration and/or collaborative operation of the newly added device 1020A-1020n within the tire changing system 100. Additional tire changing stations 101 can be added to the control console 1010 in a similar manner, such as by selecting an "add tire changing station 101" feature of the operator graphical user interface 1004 and then making the devices of the new (to be added) tire changing station discoverable to the control console by employing the pairing communication mode, where the devices are registered and associated with the new tire changing station. In other aspects, where desired, each tire changing station 101 may have a respective control console 1010.

In accordance with aspects of the present disclosure a tire change method will be described with reference to FIGS. 1, 3, 4, and 9A-9C. In some aspect, the method includes arresting or otherwise preventing rotation of the wheel hubs of the vehicle so that the wheel assemblies 111 or tires 111T can be removed. Preventing wheel hub rotation may be accomplished in any suitable manner, such as with any suitable mechanical device that actuates the braking system of the vehicle or otherwise bars or stops wheel rotation on the vehicle 110. In other aspects, the drive train of the vehicle prevents rotation of the wheel hubs without using the mechanical device noted above. At least one bot 120 as described above is provided (FIG. 9A, Block 900). In one or more aspects, one or more of cart (s) 187, tire balancing machine(s) 183, tire changing machine(s) 182, lift(s) 170, and vision system(s) 162 are provided (i.e., one or more of the tire changing station(s) 101 described above is/are provided). The bot 120 traverses (FIG. 9A, Block 901) along the traverse path 299, with the controller 160 communicably connected to the carriage drive section 121 and the bot drive section 127, to effect dynamic positioning of the at least one robotic arm 126 relative to a variable position of the vehicle 110 with the wheel 111W or tire mounted 111T thereon. In one aspect, the tire(s) 111T of the vehicle 110 are raised off of the traverse surface or the floor 198 (FIG. 9A, Block 902) so as to effect changing of the tire(s) 111T as described above. In other aspects, a normal force exerted on the tire 111T by the tire support surface 407 is removed (FIG. 9A, Block 903) so as to distance the tire 111T from the tire support surface 407 and effect changing of the tire as described above.

The variable position of the vehicle, or a variable position of the wheel or tire on the vehicle defined by the variable position is registered (FIG. 9A, Block 904) with the controller 160 and at least the positioning sensors 132 of the carriage 120C (in some aspects the visions system(s) 162 130 are also used to determine the variable position(s) and effect registration of the variable position(s) with the controller 160 as described above). In one or more aspects, the tire changing method includes reading tire sidewall information 371 of the tire 111T mounted to the wheel 111W (FIG. 9A, Block 905) to identify tire information (as described herein using one or more of the visions system(s) 130, 162) with the wheel 111W mounted in situ on the vehicle 110 or with the wheel 111W removed from the vehicle 110. In one or more aspects, the tire changing method includes identifying a make and model of the vehicle 110 to effect retrieval of original equipment (OEM) tire information for the vehicle 110 (FIG. 9A, Block 906) from the memory 161 accessible by the controller 160 (as described herein and using one or more of the vision systems 130, 162).

Figure 9A:
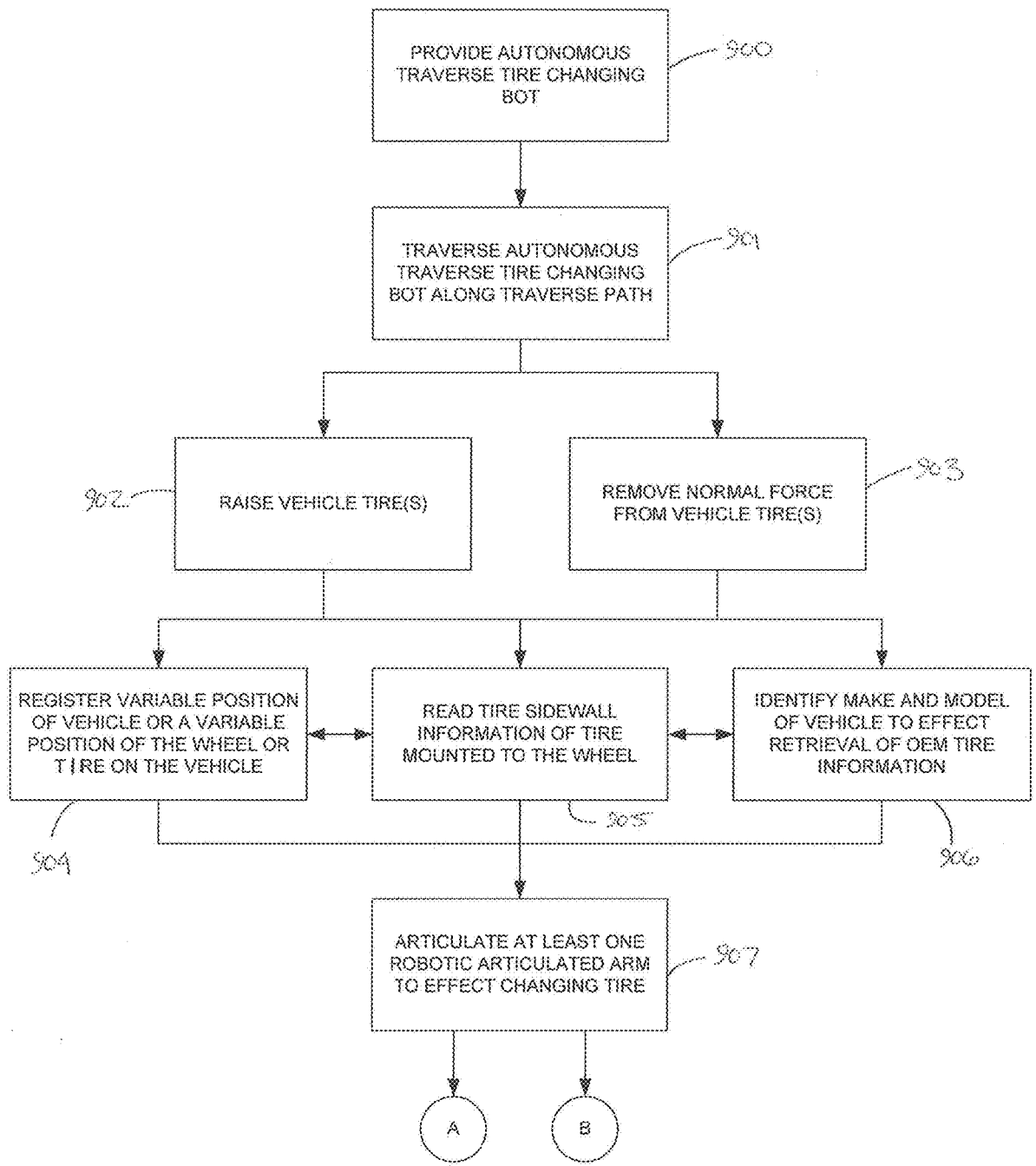
FIGS. 9A-9C are an exemplary method in accordance with aspects of the present disclosure.
Figure 9B:
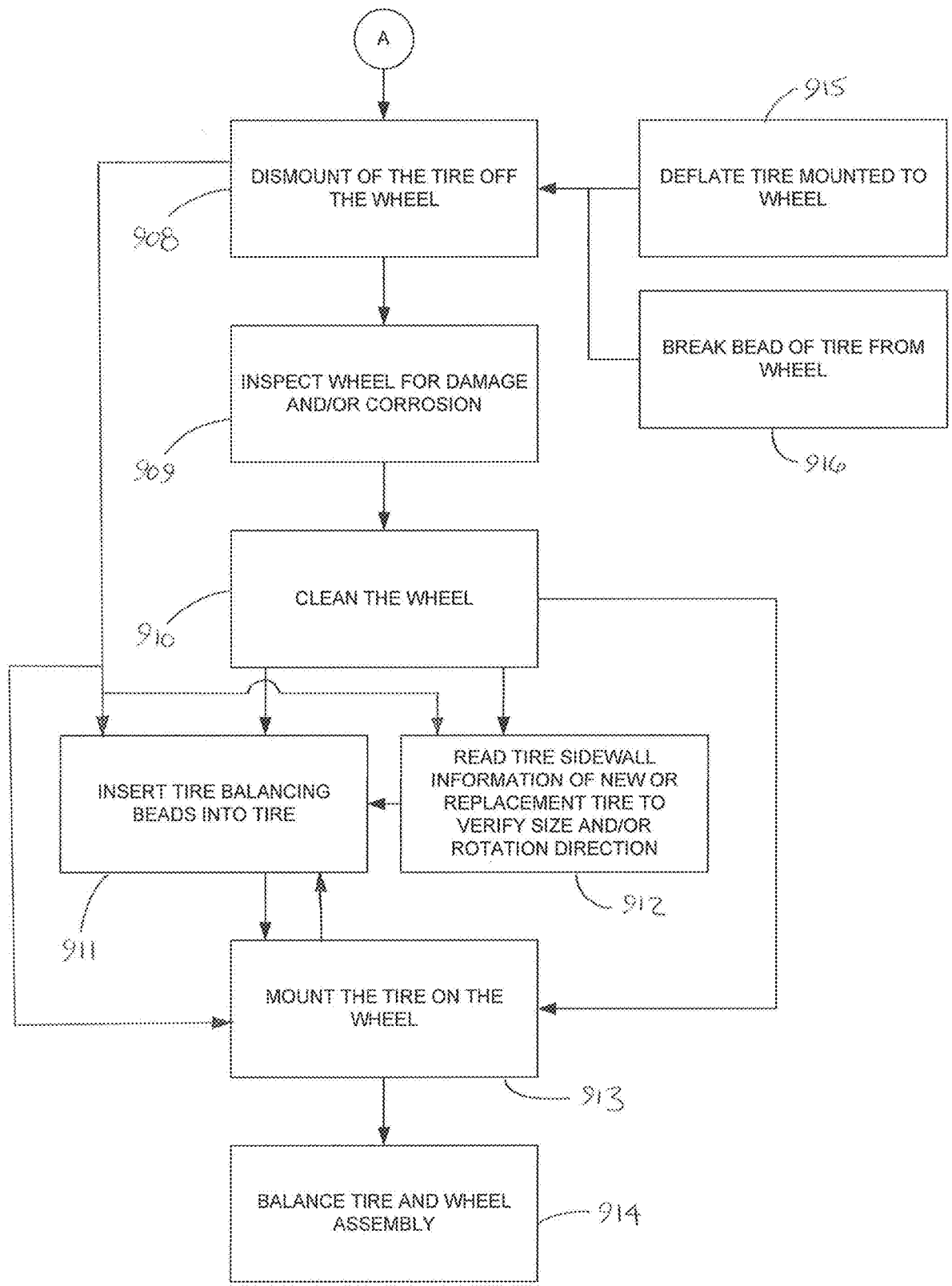
Figure 9C:
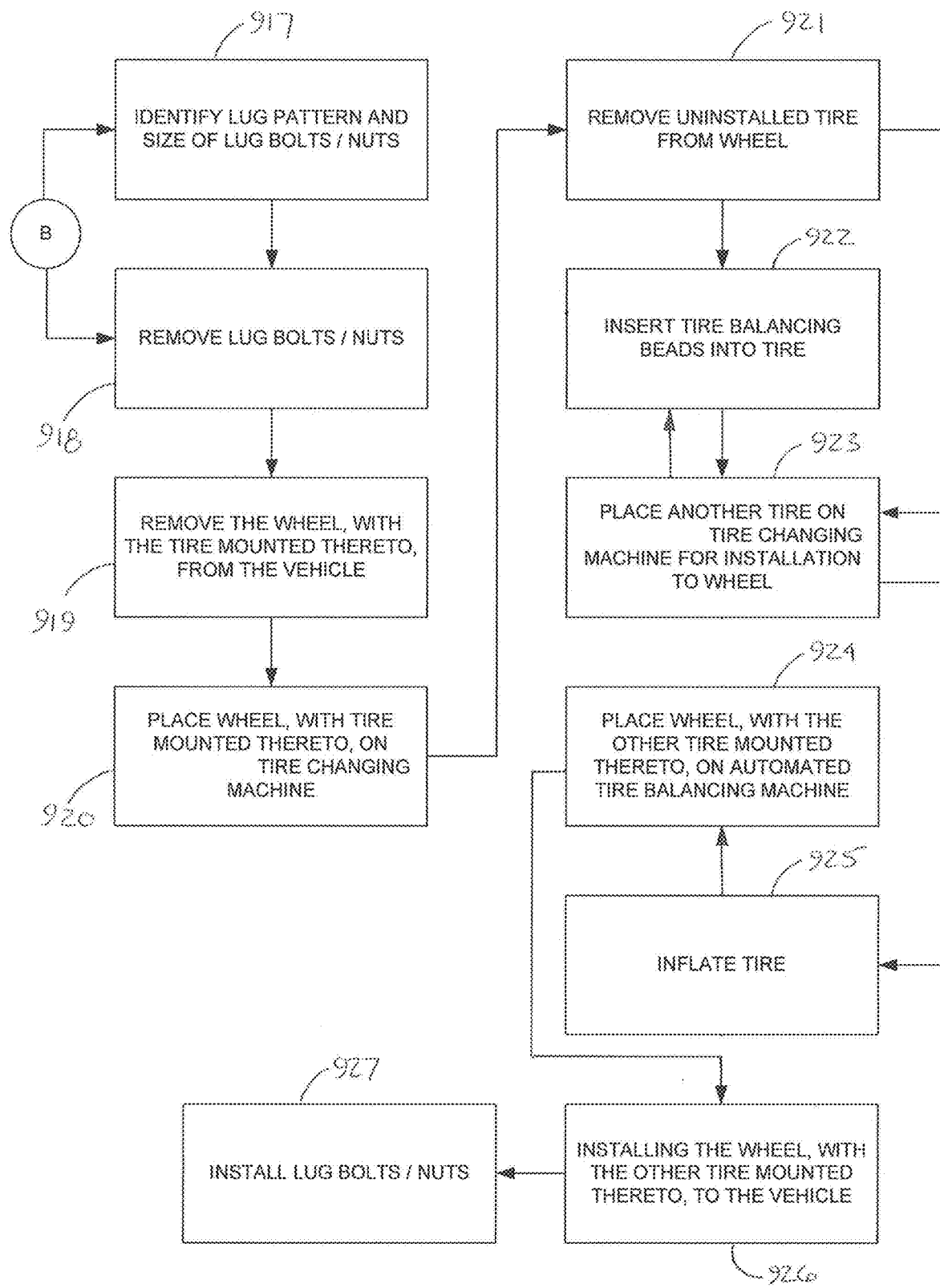

The at least one robotic arm 126 is articulated, under control of the controller 160, with the bot arm degree of freedom effecting engagement contact of the wheel or tire engagement tool 129 and the wheel 111W or the tire 111T mounted on the vehicle 110 so as to effect changing the tire 111T with the bot 120 (FIG. 9, Block 907). As may be realized from the present disclosure, a tire change can be performed with the wheel 111W mounted in situ on the vehicle or with the wheel 111W removed from the vehicle. For example, with the wheel 111W mounted in situ on the vehicle 110, the tire 111T is dismounted from the wheel (FIG. 9B, Block 908) by the bot 120 using the at least one wheel or tire engagement tool 129 (such as the tire mounting/dismounting tool 129E). To dismount the tire 111T the tire is deflated (FIG. 9B, Block 915) with, for example, the tire deflation tool 129D and the bead 300 of the tire 111T is broken from the wheel 111W (FIG. 9B, Block 916) with, for example, tire bead breaker tool 129H. As may be realized, in some aspects, deflation of the tire includes valve stem cap removal and/or valve core removal as described herein.

In one or more aspects, prior to or after removal of the tire 111T from the wheel 111W, the wheel is inspected for damage 333 and/or corrosion 334 (FIG. 9B, Block 909) as described herein, using for example one or more of the vision systems 130, 162. In one or more aspects, the wheel 111W is cleaned (FIG. 9B, Block 910) with, for example, wheel cleaning tool 129I.

In one or more aspects, tire sidewall information 371 of the new or replacement tire 111TN is read to verify a size, speed rating, rotation direction, and/or department of transportation (DOT) codes/information of the tire 111TN (i.e., to verify the new or replacement tire is a correct tire for the vehicle 110) (FIG. 9B, Block 912) using, for example, one or more of the vision systems 130, 162. The tire 111TN is mounted on the wheel 111W (FIG. 9B, Block 913) by the bot 120 using, for example, tire mounting/dismounting tool 129E. Mounting the tire 111TN to the wheel 111W includes, in some aspects, inflating the tire, such as with tire inflation tool 129L. In one or more aspects, mounting the tire 111TN to the wheel 111W includes valve stem cap installation and/or valve core installation as described herein. Where the wheel assembly 111 is to be balanced using tire balancing beads, the tire balancing beads are inserted by the bot 120 into the tire 111TN (with the tire 111TN on the wheel 111W but the tire bead 300 not being seated) or before the tire is mounted to the wheel (FIG. 9B, Block 911); otherwise the wheel assembly 111 is balanced (FIG. 9B, Block 914) by the bot 120 by rotating the wheel assembly 111 and applying wheel weights as described herein, using for example, tire balancer 129M.

Where the tire change occurs with the wheel 111W off of the vehicle 110, one or more of the vision systems 130, 162 identify one or more of the lug pattern 366 and the size of the lug bolts 350 or lug nuts 351 (FIG. 9C, Block 917) so that the lug bolts 350 or lug nuts 351 are removed (FIG. 9C, Block 918) using, for example, lug wrench 129J. The wheel 111W, with the used or old tire 111TU mounted thereto is removed from the vehicle 110 (FIG. 9C, Block 919), such as with wheel assembly grip 129A. In one aspect, the removed wheel assembly 111 is placed, by the bot 120, on an automated or semi-automated tire changing machine 182 (FIG. 9C, Block 920) where the old tire 111TU is dismounted from the wheel 111W. The bot 120 removes the uninstalled tire 111TU from the wheel 111W (FIG. 9C, Block 921) and retrieves the new or replacement tire 111TN from cart 187 or any other suitable tire holding area. The new tire 111TN is placed on the wheel, at the automated or semi-automated tire changing machine 182 (FIG. 9C, Block 923) and the tire 111TN is mounted to the wheel 111W and inflated (FIG. 9C, Block 925) to form the wheel assembly 1111. In one aspect, the bot 120 transfers the wheel assembly 111 from the tire changing machine 182 to the tire balancing machine 183 (FIG. 9C, Block 924) where the wheel assembly 111 is rotated and wheel weights are applied by the vehicle service technician 199 or by the bot 120 (as described herein); while in other aspects, where the tires are to be balanced using tire balancing beads, the bot 120 inserts tire balancing beads (either loose tire balancing beads or prepackaged beads as described herein) into the tire 111TN prior to the tire 111TN being mounted on the wheel 11W by the tire changing machine 182. The bot 120 transfers the balanced wheel assembly 111 to the vehicle 110 and installs the wheel assembly 111 to the vehicle 110 (FIG. 9C, Block 926), where the lug bolts 350 or lug nuts 351 are installed (FIG. 9C, Block 927) by the bot 120. The method is performed or repeated as necessary to change one or more tires of the vehicle 110.

In accordance with one or more aspects of the present disclosure an autonomous traverse tire changing bot comprises:
a carriage having:
a carriage frame,
wheels supporting the carriage frame, and
a carriage drive section with at least one motor defining at least one degree of freedom powering at least one of the wheels effecting autonomous traverse of the carriage, along a traverse path, relative to a traverse surface or a floor on which the autonomous traverse tire changing bot rests;
a bot frame including:
at least one robotic articulated arm mounted to the carriage so that the bot frame traverses with the carriage as a unit along the traverse path, and
a bot drive section with a motor defining a bot arm degree of freedom, separate and distinct from the at least one degree of freedom,
wherein the at least one robotic articulated arm has an end effector having a wheel or tire engagement tool disposed so that articulation of the at least one robotic articulated arm with the bot arm degree of freedom effects engagement contact of the wheel or tire engagement tool and a wheel or a tire mounted on a vehicle; and
a controller communicably connected to the carriage drive section and the bot drive section so as to effect traverse of the autonomous traverse tire changing bot along the traverse path effecting dynamic positioning of the at least one robotic articulated arm relative to a variable position of the vehicle with the wheel or tire mounted thereon.

In accordance with one or more aspects of the present disclosure the dynamic positioning of the at least one robotic articulated arm relative to the variable position of the vehicle with the wheel or tire mounted thereon is disposed so that articulation of the at least one robotic articulated arm engages the wheel or tire engagement tool to the wheel or tire on the vehicle in the variable position.

In accordance with one or more aspects of the present disclosure the carriage is track guided.

In accordance with one or more aspects of the present disclosure the carriage is configured for autonomous guidance and unrestricted traverse on an undeterministic surface of the traverse surface or the floor.

In accordance with one or more aspects of the present disclosure the carriage has positioning sensors, and the controller is configured to:
register the variable position of the vehicle,
register a variable position of the wheel or tire on the vehicle defined by the variable position, or register a position of a label or other marker placed on the wheel or tire.

In accordance with one or more aspects of the present disclosure an arm articulation axis defined by articulation of the at least one robotic articulated arm with the bot arm degree of freedom is separate and distinct from the traverse path.

In accordance with one or more aspects of the present disclosure the at least one robotic articulated arm includes more than one robotic arm, each of the more than one robotic arm having a different respective arm articulation axis, and a different respective end effector disposed for working on the wheel or tire mounted on the vehicle.

In accordance with one or more aspects of the present disclosure the at least one wheel or tire engagement tool is a tire mounting/dismounting tool that on articulation of the at least one robotic articulated arm engages the tire of the wheel mounted on the vehicle and effects mounting of the tire on the wheel and dismounting of the tire off the wheel with the wheel mounted in situ on the vehicle.

In accordance with one or more aspects of the present disclosure the autonomous traverse tire changing bot further comprises at least one vision system coupled to the controller, the vision system being configured to one or more of:
- identify a location and orientation of one or more of the wheel and tire;
- read tire sidewall information of the tire mounted to the wheel to identify tire information with the wheel mounted in situ on the vehicle;
- identify a make and model of the vehicle to effect retrieval of original equipment tire information for the vehicle from a memory accessible by the controller;
- inspect the wheel for one or more of damage and corrosion with the wheel mounted in situ on the vehicle;
- read tire sidewall information of a replacement or new tire to verify the replacement or new tire is a correct size based on one or more of the identified tire information and the original equipment tire information;
- read tire sidewall information of a replacement or new tire to verify department of transportation codes or information, where the department of transportation codes or information is stored in a database or memory in association with identifying information of the vehicle; and
- read tire sidewall information of a replacement or new tire to verify a rotation direction of the replacement or new tire.

In accordance with one or more aspects of the present disclosure the end effector includes a tire deflation tool that on articulation of the at least one robotic articulated arm deflates the tire mounted to the wheel with the wheel mounted in situ on the vehicle.

In accordance with one or more aspects of the present disclosure the end effector comprises a valve stem cap removal tool.

In accordance with one or more aspects of the present disclosure the end effector further comprises a valve core removal tool.

In accordance with one or more aspects of the present disclosure the end effector comprises a tire bead breaker tool that on articulation of the at least one robotic articulated arm breaks a bead of the tire from the wheel with the wheel mounted in situ on the vehicle.

In accordance with one or more aspects of the present disclosure the end effector is configured to clean the wheel with the wheel mounted in situ on the vehicle.

In accordance with one or more aspects of the present disclosure the end effector includes a tire balancer configured to equalize a combined weight of the tire and the wheel with the tire and wheel spinning at operating speeds and with the wheel mounted in situ on the vehicle.

In accordance with one or more aspects of the present disclosure the end effector includes a tire balancing bead dispenser configured to dispense tire balancing beads into the tire with the wheel mounted in situ on the vehicle and prior to seating a tire bead of the tire against the wheel.

In accordance with one or more aspects of the present disclosure the end effector includes a tire inflation tool that on articulation of the at least one robotic articulated arm inflates the tire mounted to the wheel with the wheel mounted in situ on the vehicle.

In accordance with one or more aspects of the present disclosure the end effector further comprises a valve core installation tool.

In accordance with one or more aspects of the present disclosure the end effector comprises a valve stem cap installation tool.

In accordance with one or more aspects of the present disclosure the autonomous traverse tire changing bot further comprises at least one vision system coupled to the controller, the vision system being configured to one or more of:
- identify a location and orientation of one or more of the wheel and tire;
- read tire sidewall information of the tire mounted to the wheel to identify tire information;
- identify a make and model of the vehicle to effect retrieval of original equipment tire information for the vehicle from a memory accessible by the controller;
- inspect the wheel for one or more of damage and corrosion;
- read tire sidewall information of a replacement or new tire to verify the replacement or new tire is a correct size based on one or more of the identified tire information and the original equipment tire information;
- read tire sidewall information of a replacement or new tire to verify department of transportation codes or information, where the department of transportation codes or information is stored in a database or memory in association with identifying information of the vehicle; and
- read tire sidewall information of a replacement or new tire to verify a rotation direction of the replacement or new tire.

In accordance with one or more aspects of the present disclosure the end effector includes a tire deflation tool that on articulation of the at least one robotic articulated arm deflates the tire mounted to the wheel.

In accordance with one or more aspects of the present disclosure the end effector comprises a valve stem cap removal tool.

In accordance with one or more aspects of the present disclosure the end effector further comprises a valve core removal tool.

In accordance with one or more aspects of the present disclosure the end effector comprises a tire bead breaker tool that on articulation of the at least one robotic articulated arm breaks a bead of the tire from the wheel.

In accordance with one or more aspects of the present disclosure the end effector is configured to clean the wheel.

In accordance with one or more aspects of the present disclosure the autonomous traverse tire changing bot further comprises at least one vision system coupled to the controller, the vision system being configured to identify:

a lug pattern of the wheel; and a size of lug bolts or lug nuts coupling the wheel to the vehicle.

In accordance with one or more aspects of the present disclosure the end effector comprises a lug wrench configured to one of both remove and install the lug bolts or lug nuts.

In accordance with one or more aspects of the present disclosure the end effector includes a tire inflation tool that on articulation of the at least one robotic articulated arm inflates the tire mounted to the wheel.

In accordance with one or more aspects of the present disclosure the end effector further comprises a valve core installation tool.

In accordance with one or more aspects of the present disclosure the end effector comprises a valve stem cap installation tool.

In accordance with one or more aspects of the present disclosure the end effector includes a tire balancer configured to equalize a combined weight of the tire and the wheel with the tire and wheel spinning at operating speeds.

In accordance with one or more aspects of the present disclosure the end effector includes a tire balancing bead dispenser configured to dispense tire balancing beads into the tire prior to seating a tire bead of the tire against the wheel.

In accordance with one or more aspects of the present disclosure the at least one robotic articulated arm is configured to install the tire and wheel on the vehicle with the tire balancing beads disposed within a wheels assembly formed by the wheel and the tire mounted to the wheel.

In accordance with one or more aspects of the present disclosure the end effector includes a wheel assembly grip that on articulation of the at least one robotic articulated arm removes the wheel, with the tire mounted thereto, from the vehicle.

In accordance with one or more aspects of the present disclosure the end effector on articulation of the at least one robotic articulated arm is configured to:

place the wheel, with the tire mounted thereto, on an automated tire changing machine; and one or more of:

remove the tire, uninstalled from the wheel by the automated tire changing machine, from the automated tire machine, and place another tire on the automated tire changing machine for installation of the other tire to the wheel by the automated tire machine.

In accordance with one or more aspects of the present disclosure the end effector on articulation of the at least one robotic articulated arm is configured to place the wheel, with the other tire mounted thereto, on an automated tire balancing machine.

In accordance with one or more aspects of the present disclosure the end effector on articulation of the at least one robotic articulated arm installs the wheel, with the other tire mounted thereto, to the vehicle.

In accordance with one or more aspects of the present disclosure an autonomous tire changing system comprises:

two or more autonomous traverse tire changing bots, each of the autonomous traverse tire changing bots having:

a carriage having:

a carriage frame, wheels supporting the carriage frame, and a carriage drive section with at least one motor defining at least one degree of freedom powering at least one of the wheels effecting autonomous traverse of the carriage, along a traverse path, relative to a traverse surface or a floor on which the autonomous traverse tire changing bot rests;

a bot frame including:

at least one robotic articulated arm mounted to the carriage so that the bot frame traverses with the carriage as a unit along the traverse path, and a bot drive section with a motor defining a bot arm degree of freedom, separate and distinct from the at least one degree of freedom, wherein the at least one robotic articulated arm has an end effector having a wheel or tire engagement tool disposed so that articulation of the at least one robotic articulated arm with the bot arm degree of freedom effects engagement contact of the wheel or tire engagement tool and a wheel or a tire mounted on a vehicle; and a controller communicably connected to the carriage drive section and the bot drive section of each of the autonomous traverse tire changing bots so as to effect traverse of one or more of the autonomous traverse tire changing bots along a respective traverse path effecting dynamic positioning of a respective at least one robotic articulated arm of the one or more of the autonomous traverse tire changing bots relative to a variable position of the vehicle with the wheel or tire mounted thereon.

In accordance with one or more aspects of the present disclosure the dynamic positioning of the respective at least one robotic articulated arm relative to the variable position of the vehicle with the wheel or tire mounted thereon is disposed so that articulation of the respective at least one robotic articulated arm engages the wheel or tire engagement tool to the wheel or tire on the vehicle in the variable position.

In accordance with one or more aspects of the present disclosure the carriage of each of the two or more autonomous traverse tire changing bots is track guided.

In accordance with one or more aspects of the present disclosure the carriage of each of the two or more autonomous traverse tire changing bots is configured for autonomous guidance and unrestricted traverse on an undeterministic surface of the traverse surface or the floor.

In accordance with one or more aspects of the present disclosure the carriage of each of the two or more autonomous traverse tire changing bots has positioning sensors, and the controller is configured to:

register the variable position of the vehicle, register a variable position of the wheel or tire on the vehicle defined by the variable position, or register a position of a label or other marker placed on the wheel or tire.

In accordance with one or more aspects of the present disclosure, for each of the autonomous traverse tire changing bots, an arm articulation axis defined by articulation of the at least one robotic articulated arm with the bot arm degree of freedom is separate and distinct from the traverse path.

In accordance with one or more aspects of the present disclosure, for at least one of the autonomous traverse tire changing bots, the at least one robotic articulated arm includes more than one robotic arm, each of the more than one robotic arm having a different respective arm articulation axis, and a different respective end effector disposed for working on the wheel or tire mounted on the vehicle.

In accordance with one or more aspects of the present disclosure, for each of the autonomous traverse tire changing bots, the at least one wheel or tire engagement tool is a tire mounting/dismounting tool that on articulation of the at least one robotic articulated arm engages the tire of the wheel mounted on the vehicle and effects mounting of the tire on the wheel and dismounting of the tire off the wheel with the wheel mounted in situ on the vehicle.

In accordance with one or more aspects of the present disclosure the autonomous tire changing system further comprises at least one vision system coupled to the controller, the vision system being configured to one or more of:
  identify a location and orientation of one or more of the wheel and tire;
  read tire sidewall information of the tire mounted to the wheel to identify tire information with the wheel mounted in situ on the vehicle;
  identify a make and model of the vehicle to effect retrieval of original equipment tire information for the vehicle from a memory accessible by the controller;
  inspect the wheel for one or more of damage and corrosion with the wheel mounted in situ on the vehicle;
  read tire sidewall information of a replacement or new tire to verify the replacement or new tire is a correct size based on one or more of the identified tire information and the original equipment tire information;
  read tire sidewall information of a replacement or new tire to verify department of transportation codes or information, where the department of transportation codes or information is stored in a database or memory in association with identifying information of the vehicle; and
  read tire sidewall information of a replacement or new tire to verify a rotation direction of the replacement or new tire.

In accordance with one or more aspects of the present disclosure, for one or more of the autonomous traverse tire changing bots, the end effector includes a tire deflation tool that on articulation of the at least one robotic articulated arm deflates the tire mounted to the wheel with the wheel mounted in situ on the vehicle.

In accordance with one or more aspects of the present disclosure, for the one or more of the autonomous traverse tire changing bots, the end effector comprises a valve stem cap removal tool.

In accordance with one or more aspects of the present disclosure, for the one or more of the autonomous traverse tire changing bots, the end effector further comprises a valve core removal tool.

In accordance with one or more aspects of the present disclosure, for one or more of the autonomous traverse tire changing bots, the end effector comprises a tire bead breaker tool that on articulation of the at least one robotic articulated arm breaks a bead of the tire from the wheel with the wheel mounted in situ on the vehicle.

In accordance with one or more aspects of the present disclosure, for one or more of the autonomous traverse tire changing bots, the end effector is configured to clean the wheel with the wheel mounted in situ on the vehicle.

In accordance with one or more aspects of the present disclosure, for one or more of the autonomous traverse tire changing bots, the end effector includes a tire balancer configured to equalize a combined weight of the tire and the wheel with the tire and wheel spinning at operating speeds and with the wheel mounted in situ on the vehicle.

In accordance with one or more aspects of the present disclosure, for one or more of the autonomous traverse tire changing bots, the end effector includes a tire balancing bead dispenser configured to dispense tire balancing beads into the tire with the wheel mounted in situ on the vehicle and prior to seating a tire bead of the tire against the wheel.

In accordance with one or more aspects of the present disclosure, for one or more of the autonomous traverse tire changing bots, the end effector includes a tire inflation tool that on articulation of the at least one robotic articulated arm inflates the tire mounted to the wheel with the wheel mounted in situ on the vehicle.

In accordance with one or more aspects of the present disclosure, for the one or more of the autonomous traverse tire changing bots, the end effector further comprises a valve core installation tool.

In accordance with one or more aspects of the present disclosure, for the one or more of the autonomous traverse tire changing bots, the end effector comprises a valve stem cap installation tool.

In accordance with one or more aspects of the present disclosure the autonomous tire changing system further comprises at least one vision system coupled to the controller, the vision system being configured to one or more of:
  identify a location and orientation of one or more of the wheel and tire;
  read tire sidewall information of the tire mounted to the wheel to identify tire information;
  identify a make and model of the vehicle to effect retrieval of original equipment tire information for the vehicle from a memory accessible by the controller;
  inspect the wheel for one or more of damage and corrosion;
  read tire sidewall information of a replacement or new tire to verify the replacement or new tire is a correct size based on one or more of the identified tire information and the original equipment tire information;
  read tire sidewall information of a replacement or new tire to verify department of transportation codes or information, where the department of transportation codes or information is stored in a database or memory in association with identifying information of the vehicle; and
  read tire sidewall information of a replacement or new tire to verify a rotation direction of the replacement or new tire.

In accordance with one or more aspects of the present disclosure, for one or more of the autonomous traverse tire changing bots, the end effector includes a tire deflation tool that on articulation of the at least one robotic articulated arm deflates the tire mounted to the wheel.

In accordance with one or more aspects of the present disclosure, for the one or more of the autonomous traverse tire changing bots, the end effector comprises a valve stem cap removal tool.

In accordance with one or more aspects of the present disclosure, for the one or more of the autonomous traverse tire changing bots, the end effector further comprises a valve core removal tool.

In accordance with one or more aspects of the present disclosure, for one or more of the autonomous traverse tire changing bots, the end effector comprises a tire bead breaker tool that on articulation of the at least one robotic articulated arm breaks a bead of the tire from the wheel.

In accordance with one or more aspects of the present disclosure, for one or more of the autonomous traverse tire changing bots, the end effector is configured to clean the wheel.

In accordance with one or more aspects of the present disclosure the autonomous tire changing system further comprises at least one vision system coupled to the controller, the vision system being configured to identify:
- a lug pattern (i.e., the layout of the wheel mounting holes expressed as the number of lugs by the diameter of the imaginary circle formed by the center of the lugs) of the wheel; and
- a size of lug bolts or lug nuts coupling the wheel to the vehicle.

In accordance with one or more aspects of the present disclosure, for one or more of the autonomous traverse tire changing bots, the end effector comprises a lug wrench configured to one of both remove and install the lug bolts or lug nuts.

In accordance with one or more aspects of the present disclosure, for one or more of the autonomous traverse tire changing bots, the end effector includes a tire inflation tool that on articulation of the at least one robotic articulated arm inflates the tire mounted to the wheel.

In accordance with one or more aspects of the present disclosure, for the one or more of the autonomous traverse tire changing bots, the end effector further comprises a valve core installation tool.

In accordance with one or more aspects of the present disclosure, for the one or more of the autonomous traverse tire changing bots, the end effector comprises a valve stem cap installation tool.

In accordance with one or more aspects of the present disclosure, for one or more of the autonomous traverse tire changing bots, the end effector includes a tire balancer configured to equalize a combined weight of the tire and the wheel with the tire and wheel spinning at operating speeds.

In accordance with one or more aspects of the present disclosure, for one or more of the autonomous traverse tire changing bots, the end effector includes a tire balancing bead dispenser configured to dispense tire balancing beads into the tire prior to seating a tire bead of the tire against the wheel.

In accordance with one or more aspects of the present disclosure the at least one robotic articulated arm is configured to install the tire and wheel on the vehicle with the tire balancing beads disposed within a wheels assembly formed by the wheel and the tire mounted to the wheel.

In accordance with one or more aspects of the present disclosure, for one or more of the autonomous traverse tire changing bots, the end effector includes a wheel assembly grip that on articulation of the at least one robotic articulated arm removes the wheel, with the tire mounted thereto, from the vehicle.

In accordance with one or more aspects of the present disclosure, for the one or more of the autonomous traverse tire changing bots, the end effector on articulation of the at least one robotic articulated arm is configured to:
- place the wheel, with the tire mounted thereto, on an automated tire changing machine; and
- one or more of:
  - remove the tire, uninstalled from the wheel by the automated tire changing machine, from the automated tire machine, and
  - place another tire on the automated tire changing machine for installation of the other tire to the wheel by the automated tire machine.

In accordance with one or more aspects of the present disclosure, for the one or more of the autonomous traverse tire changing bots, the end effector on articulation of the at least one robotic articulated arm is configured to place the wheel, with the other tire mounted thereto, on an automated tire balancing machine.

In accordance with one or more aspects of the present disclosure, for the one or more of the autonomous traverse tire changing bots, the end effector on articulation of the at least one robotic articulated arm installs the wheel, with the other tire mounted thereto, to the vehicle.

In accordance with one or more aspects of the present disclosure a method for autonomously changing a tire comprises:
- providing an autonomous traverse tire changing bot having:
- a carriage having:
- a carriage frame,
- wheels supporting the carriage frame, and
- a carriage drive section with at least one motor defining at least one degree of freedom powering at least one of the wheels effecting autonomous traverse of the carriage, along a traverse path, relative to a traverse surface or a floor on which the autonomous traverse tire changing bot rests;
- a bot frame including:
- at least one robotic articulated arm mounted to the carriage so that the bot frame traverses with the carriage as a unit along the traverse path, and
- a bot drive section with a motor defining a bot arm degree of freedom, separate and distinct from the at least one degree of freedom,
- wherein the at least one robotic articulated arm has an end effector having a wheel or tire engagement tool disposed;
- traversing the autonomous traverse tire changing bot along the traverse path, with a controller communicably connected to the carriage drive section and the bot drive section, to effect dynamic positioning of the at least one robotic articulated arm relative to a variable position of the vehicle with the wheel or tire mounted thereon; and
- articulating the at least one robotic articulated arm, under control of the controller, with the bot arm degree of freedom effecting engagement contact of the wheel or tire engagement tool and a wheel or a tire mounted on a vehicle so as to effect changing the tire with the autonomous traverse tire changing bot.

In accordance with one or more aspects of the present disclosure the dynamic positioning of the at least one robotic articulated arm relative to the variable position of the vehicle with the wheel or tire mounted thereon is disposed so that articulation of the at least one robotic articulated arm engages the wheel or tire engagement tool to the wheel or tire on the vehicle in the variable position.

In accordance with one or more aspects of the present disclosure traversing the autonomous traverse tire changing bot along the traverse path includes the carriage travelling along and being guided by a track.

In accordance with one or more aspects of the present disclosure traversing the autonomous traverse tire changing bot along the traverse path includes the carriage being autonomously guided in unrestricted traverse on an undeterministic surface of the traverse surface or the floor.

In accordance with one or more aspects of the present disclosure the method further comprises registering, with the controller and positioning sensors of the carriage, the variable position of the vehicle, or a variable position of the wheel or tire on the vehicle defined by the variable position.

In accordance with one or more aspects of the present disclosure an arm articulation axis defined by articulation of the at least one robotic articulated arm with the bot arm degree of freedom is separate and distinct from the traverse path.

In accordance with one or more aspects of the present disclosure the at least one robotic articulated arm includes more than one robotic arm, each of the more than one robotic arm having a different respective arm articulation axis, and a different respective end effector disposed for working on the wheel or tire mounted on the vehicle.

In accordance with one or more aspects of the present disclosure the method further comprises mounting of the tire on the wheel and dismounting of the tire off the wheel with the at least one wheel or tire engagement tool, wherein:
 the at least one wheel or tire engagement tool is a tire mounting/dismounting tool that on articulation of the at least one robotic articulated arm engages the tire of the wheel mounted on the vehicle, and
 the mounting of the tire on the wheel and dismounting of the tire off the wheel is effected by the autonomous traverse tire changing bot with the wheel mounted in situ on the vehicle or with the wheel removed from the vehicle.

In accordance with one or more aspects of the present disclosure the method further comprises, with at least one vision system coupled to the controller, one or more of:
 identifying a location and orientation of one or more of the wheel and tire;
 reading tire sidewall information of the tire mounted to the wheel to identify tire information with the wheel mounted in situ on the vehicle or with the wheel removed from the vehicle;
 identifying a make and model of the vehicle to effect retrieval of original equipment tire information for the vehicle from a memory accessible by the controller;
 inspecting the wheel for one or more of damage and corrosion with the wheel mounted in situ on the vehicle or with the wheel removed from the vehicle;
 reading tire sidewall information of a replacement or new tire to verify the replacement or new tire is a correct size based on one or more of the identified tire information and the original equipment tire information;
 reading tire sidewall information of a replacement or new tire to verify department of transportation codes or information, where the department of transportation codes or information is stored in a database or memory in association with identifying information of the vehicle; and
 reading tire sidewall information of a replacement or new tire to verify a rotation direction of the replacement or new tire.

In accordance with one or more aspects of the present disclosure the method further comprises, on articulation of the at least one robotic articulated arm, deflating the tire mounted to the wheel with a tire deflation tool of the end effector with the wheel mounted in situ on the vehicle or with the wheel removed from the vehicle.

In accordance with one or more aspects of the present disclosure the method, further comprises removing a valve stem cap with a valve stem cap removal tool of the end effector.

In accordance with one or more aspects of the present disclosure the method, further comprises removing a valve core with a valve core removal tool of the end effector.

In accordance with one or more aspects of the present disclosure the method further comprises, on articulation of the at least one robotic articulated arm, breaking a bead of the tire from the wheel with a tire bead breaker tool of the end effector with the wheel mounted in situ on the vehicle or with the wheel removed from the vehicle.

In accordance with one or more aspects of the present disclosure the method further comprises cleaning the wheel with the end effector with the wheel mounted in situ on the vehicle or with the wheel removed from the vehicle.

In accordance with one or more aspects of the present disclosure the method further comprises equalizing, with a tire balancer of the end effector, a combined weight of the tire and the wheel with the tire and wheel spinning at operating speeds and with the wheel mounted in situ on the vehicle.

In accordance with one or more aspects of the present disclosure the method further comprises, with a wheel assembly grip of the end effector and on articulation of the at least one robotic articulated arm, removing the wheel, with the tire mounted thereto, from the vehicle.

In accordance with one or more aspects of the present disclosure the method further comprises, with the end effector on articulation of the at least one robotic articulated arm:
 placing the wheel, with the tire mounted thereto, on an automated tire changing machine; and
 one or more of:
 removing the tire, uninstalled from the wheel by the automated tire changing machine, from the automated tire machine, and
 placing another tire on the automated tire changing machine for installation of the other tire to the wheel by the automated tire machine.

In accordance with one or more aspects of the present disclosure the method further comprises, with the end effector on articulation of the at least one robotic articulated arm, placing the wheel, with the other tire mounted thereto, on an automated tire balancing machine.

In accordance with one or more aspects of the present disclosure the method further comprises, with the end effector on articulation of the at least one robotic articulated arm, installing the wheel, with the other tire mounted thereto, to the vehicle.

In accordance with one or more aspects of the present disclosure the method further comprises dispensing, with a tire balancing bead dispenser of the end effector, tire balancing beads into the tire prior to seating a tire bead of the tire against the wheel.

In accordance with one or more aspects of the present disclosure the method further comprises, with the at least one robotic articulated arm, installing the tire and wheel on the vehicle with the tire balancing beads disposed within a wheels assembly formed by the wheel and the tire mounted to the wheel.

In accordance with one or more aspects of the present disclosure the method further comprises, with a tire inflation tool of the end effector and on articulation of the at least one robotic articulated arm, inflating the tire mounted to the wheel with the wheel mounted in situ on the vehicle or removed from the vehicle.

In accordance with one or more aspects of the present disclosure the method further comprises installing a valve core with a valve core installation tool of the end effector.

In accordance with one or more aspects of the present disclosure the method further comprises installing a valve stem cap with a valve stem cap installation tool of the end effector.

In accordance with one or more aspects of the present disclosure the method further comprises, with at least one vision system coupled to the controller, identifying:
 a lug pattern of the wheel; and a size of lug bolts or lug nuts coupling the wheel to the vehicle.

In accordance with one or more aspects of the present disclosure the method further comprises one of both removing and installing the lug bolts or lug nuts with a lug wrench of the end effector.

In accordance with one or more aspects of the present disclosure method further comprises with a tire balancer of the end effector, equalizing a combined weight of the tire and the wheel with the tire and wheel spinning at operating speeds.

In accordance with one or more aspects of the present disclosure the method further comprises raising the tires of the vehicle off of the traverse surface or the floor so as to effect changing of the tire.

In accordance with one or more aspects of the present disclosure the method further comprises removing a normal force exerted on the tire by a tire support surface so as to distance the tire from the tire support surface and effect changing of the tire.

In accordance with one or more aspects of the present disclosure, an autonomous traverse tire changing bot comprising:
a carriage having:
a carriage frame,
wheels supporting the carriage frame, and
a carriage drive section with at least one motor defining at least one degree of freedom powering at least one of the wheels effecting autonomous traverse of the carriage, along a traverse path, relative to a traverse surface or a floor on which the autonomous traverse tire changing bot rests;
a bot frame including:
at least one actuator mounted to the carriage so that the bot frame traverses with the carriage as a unit along the traverse path, and
a bot drive section with a motor defining an actuator degree of freedom, separate and distinct from the at least one degree of freedom,
wherein the at least one actuator has an end effector having a wheel or tire engagement tool disposed so that articulation of the at least one actuator with the actuator degree of freedom effects engagement contact of the wheel or tire engagement tool and a wheel or a tire mounted on a vehicle; and
a controller communicably connected to the carriage drive section and the bot drive section so as to effect traverse of the autonomous traverse tire changing bot along the traverse path effecting dynamic positioning of the at least one actuator relative to a variable position of the vehicle with the wheel or tire mounted thereon.

In accordance with one or more aspects of the present disclosure, the dynamic positioning of the at least one actuator relative to the variable position of the vehicle with the wheel or tire mounted thereon is disposed so that articulation of the at least one actuator engages the wheel or tire engagement tool to the wheel or tire on the vehicle in the variable position.

In accordance with one or more aspects of the present disclosure, the carriage is track guided.

In accordance with one or more aspects of the present disclosure, the carriage is configured for autonomous guidance and unrestricted traverse on an undeterministic surface of the traverse surface or the floor.

In accordance with one or more aspects of the present disclosure, the carriage has positioning sensors, and the controller is configured to:
register the variable position of the vehicle,
register a variable position of the wheel or tire on the vehicle defined by the variable position, or
register a position of a label or other marker placed on the wheel or tire.

In accordance with one or more aspects of the present disclosure, an actuator articulation axis defined by articulation of the at least one actuator with the actuator degree of freedom is separate and distinct from the traverse path.

In accordance with one or more aspects of the present disclosure, the at least one actuator includes more than one actuator, each of the more than one actuator having a different respective actuator articulation axis, and a different respective end effector disposed for working on the wheel or tire mounted on the vehicle.

In accordance with one or more aspects of the present disclosure, the at least one wheel or tire engagement tool is a tire mounting/dismounting tool that on articulation of the at least one actuator engages the tire of the wheel mounted on the vehicle and effects mounting of the tire on the wheel and dismounting of the tire off the wheel with the wheel mounted in situ on the vehicle.

In accordance with one or more aspects of the present disclosure, the autonomous traverse tire changing bot further comprises at least one vision system coupled to the controller, the vision system being configured to one or more of:
identify a location and orientation of one or more of the wheel and tire;
read tire sidewall information of the tire mounted to the wheel to identify tire information with the wheel mounted in situ on the vehicle;
identify a make and model of the vehicle to effect retrieval of original equipment tire information for the vehicle from a memory accessible by the controller;
inspect the wheel for one or more of damage and corrosion with the wheel mounted in situ on the vehicle;
read tire sidewall information of a replacement or new tire to verify the replacement or new tire is a correct size based on one or more of the identified tire information and the original equipment tire information;
read tire sidewall information of a replacement or new tire to verify department of transportation codes or information, where the department of transportation codes or information is stored in a database or memory in association with identifying information of the vehicle; and
read tire sidewall information of a replacement or new tire to verify a rotation direction of the replacement or new tire.

In accordance with one or more aspects of the present disclosure, the end effector includes a tire deflation tool that on articulation of the at least one actuator deflates the tire mounted to the wheel with the wheel mounted in situ on the vehicle.

In accordance with one or more aspects of the present disclosure, the end effector comprises a valve stem cap removal tool.

In accordance with one or more aspects of the present disclosure, the end effector further comprises a valve core removal tool.

In accordance with one or more aspects of the present disclosure, the end effector comprises a tire bead breaker tool that on articulation of the at least one actuator breaks a bead of the tire from the wheel with the wheel mounted in situ on the vehicle.

In accordance with one or more aspects of the present disclosure, the end effector is configured to clean the wheel with the wheel mounted in situ on the vehicle.

In accordance with one or more aspects of the present disclosure, the end effector includes a tire balancer configured to equalize a combined weight of the tire and the wheel with the tire and wheel spinning at operating speeds and with the wheel mounted in situ on the vehicle.

In accordance with one or more aspects of the present disclosure, the end effector includes a tire balancing bead dispenser configured to dispense tire balancing beads into the tire with the wheel mounted in situ on the vehicle and prior to seating a tire bead of the tire against the wheel.

In accordance with one or more aspects of the present disclosure, the end effector includes a tire inflation tool that on articulation of the at least one actuator inflates the tire mounted to the wheel with the wheel mounted in situ on the vehicle.

In accordance with one or more aspects of the present disclosure, the end effector further comprises a valve core installation tool.

In accordance with one or more aspects of the present disclosure, the end effector comprises a valve stem cap installation tool.

In accordance with one or more aspects of the present disclosure, the autonomous traverse tire changing bot further comprises at least one vision system coupled to the controller, the vision system being configured to one or more of:
  identify a location and orientation of one or more of the wheel and tire;
  read tire sidewall information of the tire mounted to the wheel to identify tire information;
  identify a make and model of the vehicle to effect retrieval of original equipment tire information for the vehicle from a memory accessible by the controller;
  inspect the wheel for one or more of damage and corrosion;
  read tire sidewall information of a replacement or new tire to verify the replacement or new tire is a correct size based on one or more of the identified tire information and the original equipment tire information;
  read tire sidewall information of a replacement or new tire to verify department of transportation codes or information, where the department of transportation codes or information is stored in a database or memory in association with identifying information of the vehicle; and
  read tire sidewall information of a replacement or new tire to verify a rotation direction of the replacement or new tire.

In accordance with one or more aspects of the present disclosure, the end effector includes a tire deflation tool that on articulation of the at least one actuator deflates the tire mounted to the wheel.

In accordance with one or more aspects of the present disclosure, the end effector comprises a valve stem cap removal tool.

In accordance with one or more aspects of the present disclosure, the end effector further comprises a valve core removal tool.

In accordance with one or more aspects of the present disclosure, the end effector comprises a tire bead breaker tool that on articulation of the at least one actuator breaks a bead of the tire from the wheel.

In accordance with one or more aspects of the present disclosure, the end effector is configured to clean the wheel.

In accordance with one or more aspects of the present disclosure, the autonomous traverse tire changing bot further comprises at least one vision system coupled to the controller, the vision system being configured to identify:
  a lug pattern of the wheel; and
  a size of lug bolts or lug nuts coupling the wheel to the vehicle.

In accordance with one or more aspects of the present disclosure, the end effector comprises a lug wrench configured to one of both remove and install the lug bolts or lug nuts.

In accordance with one or more aspects of the present disclosure, the end effector includes a tire inflation tool that on articulation of the at least one actuator inflates the tire mounted to the wheel.

In accordance with one or more aspects of the present disclosure, the end effector further comprises a valve core installation tool.

In accordance with one or more aspects of the present disclosure, the end effector comprises a valve stem cap installation tool.

In accordance with one or more aspects of the present disclosure, the end effector includes a tire balancer configured to equalize a combined weight of the tire and the wheel with the tire and wheel spinning at operating speeds.

In accordance with one or more aspects of the present disclosure:
  the end effector includes a tire balancing bead dispenser configured to dispense tire balancing beads into the tire prior to seating a tire bead of the tire against the wheel; and
  the at least one actuator is configured to install the tire and wheel on the vehicle with the tire balancing beads disposed within a wheel assembly formed by the wheel and the tire mounted to the wheel.

In accordance with one or more aspects of the present disclosure, the end effector includes a wheel assembly grip that on articulation of the at least one actuator removes the wheel, with the tire mounted thereto, from the vehicle.

In accordance with one or more aspects of the present disclosure, the end effector on articulation of the at least one actuator is configured to:
  place the wheel, with the tire mounted thereto, on an automated tire changing machine; and
  one or more of:
  remove the tire, uninstalled from the wheel by the automated tire changing machine, from the automated tire machine, and
  place another tire on the automated tire changing machine for installation of the other tire to the wheel by the automated tire machine.

In accordance with one or more aspects of the present disclosure, the end effector on articulation of the at least one actuator is configured to place the wheel, with the other tire mounted thereto, on an automated tire balancing machine.

In accordance with one or more aspects of the present disclosure, the end effector on articulation of the at least one actuator installs the wheel, with the other tire mounted thereto, to the vehicle.

In accordance with one or more aspects of the present disclosure, a method for autonomously changing a tire is provided. The method comprises:
  providing an autonomous traverse tire changing bot having:
  a carriage having:
  a carriage frame,
  wheels supporting the carriage frame, and a carriage drive section with at least one motor defining at least one degree of freedom powering at least one of the wheels effecting autonomous traverse of the carriage, along a traverse path, relative to a traverse surface or a floor on which the autonomous traverse tire changing bot rests;

a bot frame including:

at least one actuator mounted to the carriage so that the bot frame traverses with the carriage as a unit along the traverse path, and a bot drive section with a motor defining an actuator degree of freedom, separate and distinct from the at least one degree of freedom, wherein the at least one actuator has an end effector having a tire engagement tool;

traversing the autonomous traverse tire changing bot along the traverse path, with a controller communicably connected to the carriage drive section and the bot drive section, to effect dynamic positioning of the at least one actuator relative to a variable position of a vehicle with the tire mounted thereon; and actuating the at least one actuator, under control of the controller, with the actuator degree of freedom effecting engagement contact of the tire engagement tool and the tire mounted on the vehicle so as to effect changing the tire with the autonomous traverse tire changing bot.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. An autonomous traverse tire changing bot comprising:
a carriage having:
a carriage frame,
wheels supporting the carriage frame,
and a carriage drive section with at least one motor defining at least one degree of freedom powering at least one of the wheels effecting autonomous traverse of the carriage, along a traverse path, relative to a traverse surface or a floor on which the autonomous traverse tire changing bot rests;
a bot frame including:
at least one actuator mounted to the carriage so that the bot frame traverses with the carriage as a unit along the traverse path, and
a bot drive section with a motor defining an actuator degree of freedom, separate and distinct from the at least one degree of freedom,
wherein the at least one actuator has an end effector having a tire engagement tool disposed so that articulation of the at least one actuator with the actuator degree of freedom effects engagement contact of the tire engagement tool and a tire mounted on a vehicle; and
a controller communicably connected to the carriage drive section and the bot drive section so as to effect traverse of the autonomous traverse tire changing bot along the traverse path effecting dynamic positioning of the at least one actuator relative to a variable position of the vehicle with the tire mounted thereon.

2. The autonomous traverse tire changing bot of claim 1, wherein the dynamic positioning of the at least one actuator relative to the variable position of the vehicle with tire mounted thereon is disposed so that articulation of the at least one actuator engages the tire engagement tool to the tire on the vehicle in the variable position.

3. The autonomous traverse tire changing bot of claim 1, wherein the carriage is track guided.

4. The autonomous traverse tire changing bot of claim 1, wherein the carriage is configured for autonomous guidance and unrestricted traverse on an undeterministic surface of the traverse surface or the floor.

5. The autonomous traverse tire changing bot of claim 1, wherein the carriage has positioning sensors, and the controller is configured to:
register the variable position of the vehicle,
register a variable position of the tire on the vehicle defined by the variable position, or
register a position of a label or other marker placed on the tire.

6. The autonomous traverse tire changing bot of claim 1, wherein an actuator articulation axis defined by articulation of the at least one actuator with the actuator degree of freedom is separate and distinct from the traverse path.

7. The autonomous traverse tire changing bot of claim 6, wherein the at least one actuator includes more than one actuator, each of the more than one actuator having a different respective actuator articulation axis, and a different respective end effector disposed for working on the tire mounted on the vehicle.

8. The autonomous traverse tire changing bot of claim 1, wherein the at least one wheel or tire engagement tool is a tire mounting/dismounting tool that on articulation of the at least one actuator engages the tire of a wheel mounted on the vehicle and effects mounting of the tire on the wheel and dismounting of the tire off the wheel with the wheel mounted in situ on the vehicle.

9. The autonomous traverse tire changing bot of claim 1, further comprising at least one vision system coupled to the controller, the vision system being configured to one or more of:
identify a location and orientation of one or more of a wheel and tire;
read tire sidewall information of the tire mounted to the wheel to identify tire information with the wheel mounted in situ on the vehicle;
identify a make and model of the vehicle to effect retrieval of original equipment tire information for the vehicle from a memory accessible by the controller;
inspect the wheel for one or more of damage and corrosion with the wheel mounted in situ on the vehicle;
read tire sidewall information of a replacement or new tire to verify the replacement or new tire is a correct size based on one or more of the identified tire information and the original equipment tire information;
read tire sidewall information of a replacement or new tire to verify department of transportation codes or information, where the department of transportation codes or information is stored in a database or memory in association with identifying information of the vehicle; and
read tire sidewall information of a replacement or new tire to verify a rotation direction of the replacement or new tire.

10. The autonomous traverse tire changing bot of claim 1, wherein the end effector includes a tire deflation tool that on articulation of the at least one actuator deflates the tire mounted to a wheel with the wheel mounted in situ on the vehicle.

11. The autonomous traverse tire changing bot of claim 10, wherein the end effector comprises a valve stem cap removal tool.

12. The autonomous traverse tire changing bot of claim 10, wherein the end effector further comprises a valve core removal tool.

13. The autonomous traverse tire changing bot of claim 1, wherein the end effector comprises a tire bead breaker tool that on articulation of the at least one actuator breaks a bead of the tire from a wheel with the wheel mounted in situ on the vehicle.

14. The autonomous traverse tire changing bot of claim 1, wherein the end effector is configured to clean a wheel with the wheel mounted in situ on the vehicle.

15. The autonomous traverse tire changing bot of claim 1, wherein the end effector includes a tire balancer configured to equalize a combined weight of the tire and a wheel with the tire and the wheel spinning at operating speeds and with the wheel mounted in situ on the vehicle.

16. The autonomous traverse tire changing bot of claim 1, wherein the end effector includes a tire balancing bead dispenser configured to dispense tire balancing beads into the tire with a wheel mounted in situ on the vehicle and prior to seating a tire bead of the tire against the wheel.

17. The autonomous traverse tire changing bot of claim 1, wherein the end effector includes a tire inflation tool that on articulation of the at least one actuator inflates the tire mounted to a wheel with the wheel mounted in situ on the vehicle.

18. The autonomous traverse tire changing bot of claim 17, wherein the end effector further comprises a valve core installation tool.

19. The autonomous traverse tire changing bot of claim 17, wherein the end effector comprises a valve stem cap installation tool.

20. The autonomous traverse tire changing bot of claim 1, further comprising at least one vision system coupled to the controller, the vision system being configured to one or more of:
    identify a location and orientation of one or more of a wheel and tire;
    read tire sidewall information of the tire mounted to the wheel to identify tire information;
    identify a make and model of the vehicle to effect retrieval of original equipment tire information for the vehicle from a memory accessible by the controller;
    inspect the wheel for one or more of damage and corrosion;
    read tire sidewall information of a replacement or new tire to verify the replacement or new tire is a correct size based on one or more of the identified tire information and the original equipment tire information;
    read tire sidewall information of a replacement or new tire to verify department of transportation codes or information, where the department of transportation codes or information is stored in a database or memory in association with identifying information of the vehicle; and
    read tire sidewall information of a replacement or new tire to verify a rotation direction of the replacement or new tire.

21. The autonomous traverse tire changing bot of claim 1, wherein the end effector includes a tire deflation tool that on articulation of the at least one actuator deflates the tire mounted to a wheel.

22. The autonomous traverse tire changing bot of claim 21, wherein the end effector comprises a valve stem cap removal tool.

23. The autonomous traverse tire changing bot of claim 21, wherein the end effector further comprises a valve core removal tool.

24. The autonomous traverse tire changing bot of claim 21, wherein the end effector comprises a tire bead breaker tool that on articulation of the at least one actuator breaks a bead of the tire from the wheel.

25. The autonomous traverse tire changing bot of claim 21, wherein the end effector is configured to clean the wheel.

26. The autonomous traverse tire changing bot of claim 1, wherein the end effector includes one or more of:
    a tire inflation tool that on articulation of the at least one actuator inflates the tire mounted to a wheel,
    a valve core installation tool, and
    a valve stem cap installation tool.

27. The autonomous traverse tire changing bot of claim 1, wherein the end effector includes a tire balancer configured to equalize a combined weight of the tire and a wheel with the tire and the wheel spinning at operating speeds.

28. A method for autonomously changing a tire, the method comprising:
    providing an autonomous traverse tire changing bot having:
        a carriage having:
            a carriage frame,
            wheels supporting the carriage frame, and
            a carriage drive section with at least one motor defining at least one degree of freedom powering at least one of the wheels effecting autonomous traverse of the carriage, along a traverse path, relative to a traverse surface or a floor on which the autonomous traverse tire changing bot rests;
        a bot frame including:
            at least one actuator mounted to the carriage so that the bot frame traverses with the carriage as a unit along the traverse path, and
            a bot drive section with a motor defining an actuator degree of freedom, separate and distinct from the at least one degree of freedom,
            wherein the at least one actuator has an end effector having a tire engagement tool;
    traversing the autonomous traverse tire changing bot along the traverse path, with a controller communicably connected to the carriage drive section and the bot drive section, to effect dynamic positioning of the at least one actuator relative to a variable position of a vehicle with the tire mounted thereon; and
    actuating the at least one actuator, under control of the controller, with the actuator degree of freedom effecting engagement contact of the tire engagement tool and the tire mounted on the vehicle so as to effect changing the tire with the autonomous traverse tire changing bot.

* * * * *